(12) United States Patent  
Sirkar

(10) Patent No.: US 9,751,042 B2
(45) Date of Patent: Sep. 5, 2017

(54) SYSTEMS AND METHODS FOR $CO_2$ REMOVAL FROM FLUE GAS BY TEMPERATURE SWING ABSORPTION

(71) Applicant: New Jersey Institute of Technology, Newark, NJ (US)

(72) Inventor: Kamalesh K. Sirkar, Bridgewater, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 248 days.

(21) Appl. No.: 14/801,380

(22) Filed: Jul. 16, 2015

(65) Prior Publication Data

US 2016/0016111 A1    Jan. 21, 2016

Related U.S. Application Data

(60) Provisional application No. 62/026,490, filed on Jul. 18, 2014, provisional application No. 62/160,053, filed on May 12, 2015.

(51) Int. Cl.
*B01D 53/14* (2006.01)
*B01D 53/22* (2006.01)

(52) U.S. Cl.
CPC ....... *B01D 53/1475* (2013.01); *B01D 53/229* (2013.01); *B01D 53/1425* (2013.01);
(Continued)

(58) Field of Classification Search
None
See application file for complete search history.

(56) References Cited

U.S. PATENT DOCUMENTS 5,928,409 A * 7/1999 Sirkar .................... B01D 53/22
95/45
2012/0152117 A1* 6/2012 Lively ................ B01D 53/0438
95/139

OTHER PUBLICATIONS

Cai et al., "Contaminant removal from natural gas using dual hollow fiber membrane contactors", Journal of Membrane Science 397-398 (2012) 9-16.*

(Continued)

*Primary Examiner* — Anita Nassiri Motlagh
(74) *Attorney, Agent, or Firm* — McCarter & English, LLP

(57) ABSTRACT

The present disclosure provides improved systems, assemblies and methods to remove and recover $CO_2$ from emissions. More particularly, the present disclosure provides improved membrane contactors configured to remove $CO_2$ from flue gas by temperature swing absorption. In exemplary embodiments, the present disclosure provides a novel hollow fiber membrane contactor that integrates absorption and stripping using a nonvolatile reactive absorbent (e.g., 80% polyamidoamine (PAMAM) dendrimer generation 0, and 20% of an ionic liquid (IL)). Equilibrium $CO_2$ absorption in the nonvolatile viscous mixed absorbent is as high as 6.37 mmol$CO_2$/g absorbent in the presence of moisture at 50° C. A novel membrane contactor is provided for $CO_2$ absorption and stripping via a process identified as temperature swing membrane absorption (TSMAB). The contactor integrates non-dispersive gas absorption and hot water-based $CO_2$ stripping in one device/assembly containing two sets of commingled hollow fibers.

11 Claims, 12 Drawing Sheets

(52) U.S. Cl.
CPC .... *B01D 53/1493* (2013.01); *B01D 2053/224* (2013.01); *B01D 2252/20415* (2013.01); *B01D 2252/20421* (2013.01); *B01D 2252/20426* (2013.01); *B01D 2252/20431* (2013.01); *B01D 2252/20489* (2013.01); *B01D 2252/30* (2013.01); *B01D 2257/504* (2013.01); *B01D 2258/0283* (2013.01); *B01D 2325/38* (2013.01); *Y02C 10/04* (2013.01); *Y02C 10/06* (2013.01); *Y02C 10/10* (2013.01)

(56) References Cited

OTHER PUBLICATIONS

Happel, J., Viscous Flow Relative to Arrays of Cylinders, AIChE J. 5(2), pp. 174-177, (1959).
Bhaumik et al., Hollow Fiber Membrane-based Rapid Pressure Swing Absorption, AIChE, J., 42(2), pp. 409-421, (1996).
Kovvali et al., Dendrimer Membranes: A $CO_2$-selective Molecular Gate, J. Am. Chem. Soc. 31, pp. 7594-7595, (2000).
Kosaraju et al., Hollow Fiber Membrane Contractor Based $CO_2$ Absorption-Stripping Using Novel Solvents and Membranes, Ind. Eng. Chem. Res. 44, pp. 1250-1258, (2005).
Li et al., Review of $CO_2$ Absorption Using Chemical Solvents in Hollow Fiber Membrane Contractors, Sep. and Purif. Technol. 41, pp. 109-122, (2005).
Duan et al., Development of PAMAM Dendrimer Composite Membranes for $CO_2$ Separation, J. Membrane Sci. 293, pp. 2-6, (2006).
Bituminous Coal and Natural Gas to Electricity, vol. 1, NETL Technical Report No. DOE/NETL-2007/1281, Aug. 2007, http://www.netl.doe.gov/energy-analyses/pubs/Bituminous%20Baseline_Final%20Report.pdf.
Kouketsu et al., PAMAM Dendrimer Composite Membranes for $CO_2$ Separation: Formation of a Chitosan Gutter Layer, J. Membrane Sci. 287, pp. 51-59, (2007).
Hicks et al., Designing Adsorbent for CO2 Capture from Flue Gas—Hyperbranched Aminosilicas Capable of Capturing CO2 Reversibly, J. Am. Chem. Soc., 130, pp. 2902-2903, (2008).
Taniguchi et al., Facile Fabrication of a Novel High Performance $CO_2$ Separation Membrane: Immobilization of Poly (amidoamine) Dendrimers in Poly (ethylene glycol) Networks, J. Membrane Sci. 322, pp. 277-280, (2008).
Choi et al., Adsorbent Materials for Carbon Dioxide Capture from Large Anthopogenic Point Sources, ChemSusChem, 2, pp. 796-854, (2009).
Ma et al., Molecular Basket Sorbents for Separation of CO2 and H2S from Various Gas Streams, J. Am. Chem. Soc., 131, pp. 5777-5783, (2009).
Albo et al., Carbon Dioxide Capture from Flue Gases using Cross-flow Membrane Contractor and the Ionic Liquid 1-Ethyl-3-methylimidazolium Ethyl sulfate, Ind. Eng. Chem. Res. 49, pp. 11045-11051, (2010).
Goeppert et al., Carbon Dioxide Capture from the Air Using a Polyamine Based Regenerable Solid Adsorbent, J. Am. Chem. Soc., 133, pp. 20164-20167, (2011).
Luis et al., Non-dispersive Absorption for $CO_2$ Capture: From the laboratory to industry, J Chem. Technol. Biotechnol. 86, pp. 769-775, (2011).
Stuckert et al., CO2 Capture from the Atmosphere and Simultaneous Concentration Using Zeolites and Amine-Grafted SBA-15, Environ. Sci. Technol., 45, pp. 20164-20167, (2011).
Duan et al., Poly (amidoamine) Dendrimer/poly (vinyl alcohol) Hybrid Membranes for $CO_2$ capture, J. Membrane Sci. 423, pp. 107-112, (2012).
Favre et al., Membrane Contractors for Intensified Post-combustion Carbon Dioxide Capture by Gas-liquid Absorption Processes, J. Membrane Sci. 407-408, pp. 1-7, (2012).
Kuwahara et al., Dramatic Enhancement of CO2 Uptake by Poly(ethyleneimine) using Zirconosilicate Supports, J. Am. Chem. Soc., 134, pp. 10757-10760, (2012).
Pacheco et al., Aminosilane-Functionalized Cellulosic Polymer for Increased CO2 Sorption, Ind. Eng. Chem. Res., 51, pp. 503-514, (2012).
Samanta et al., Post-Combustion CO2 Capture Using Solid Sorbents: A Review, Ind. Eng. Chem. Res. 51, pp. 1438-1463, (2012).
Chau et al., Solubilities of CO2 and Helium in an Ionic Liquid Containing Poly(amidoamine) Dendrimer Gen 0, Ind. Eng. Chem. Res., 52, pp. 10484-10494, (2013).
Jie et al., Preliminary Studies of CO2 Removal from Pre-combustion Syngas through Pressure Swing Membrane Absorption Process with Ionic Liquid as Absorbent, Ind. Eng. Chem. Res. 52, pp. 8783-8799, (2013).
Li et al., Post-combustion $CO_2$ Capture using Super-hydrophobic, Polyetheretherketone, Hollow Fiber Membrane Contractors, J. Membrane Sci. 430, pp. 79-86, (2013).
Zhang et al., Gas-Liquid Membrane Contractor for Acid Gas Removal: Recent Advances and Future Challenges, COCHE, 2(2), pp. 255-262, (2013).
Chau et al., Pressure Swing Membrane Absorption Process for Shifted Syngas Separation: Modeling vs. Experiments for Pure Ionic Liquid, J. Membrane Sci., 453, pp. 61-70, (2014).
Gomez-Coma et al., Non-dispersive Absorption of $CO_2$ in [emim][EtSO$_4$] and [emim][AC]: Temperature Influence, Sep. and Purif. Technol. 132, pp. 120-125, (2014).
Jie et al., Enhanced Pressure Swing Membrane Absorption Process for CO2 Removal from Shifted Syngas with Dendrimer-Ionic Liquid Mixtures as Absorbent, Ind. Eng. Chem. Res. 53, pp. 3305-3320, (2014).
Mulukutla et al., Novel Scrubbing System for Post-Combustion $CO_2$ Capture and Recovery: Experimental Studies, J. Membrane Sci. 471, pp. 16-26, (2014).
U.S. Appl. No. 62/160,053, filed May 12, 2015.
U.S. Appl. No. 62/026,490, filed Jul. 18, 2014.

* cited by examiner

SYSTEMS AND METHODS FOR $CO_2$ REMOVAL FROM FLUE GAS BY TEMPERATURE SWING ABSORPTION

CROSS-REFERENCE TO RELATED APPLICATIONS

This application claims priority to: (i) Provisional App. Ser. No. 62/026,490 filed Jul. 18, 2014; and (ii) Provisional App. Ser. No. 62/160,053 filed May 12, 2015, both of which are hereby incorporated by reference in their entireties.

FIELD OF THE DISCLOSURE

The present disclosure relates to systems, assemblies and methods to remove and recover $CO_2$ from emissions and, more particularly, to membrane contactors configured for $CO_2$ removal from flue gas by temperature swing absorption.

BACKGROUND OF THE DISCLOSURE

In general, flue gas from power plants using coal combustion is one of the primary sources of $CO_2$ emission. To mitigate global warming caused by emission of greenhouse gases such as $CO_2$, technologies developed to remove $CO_2$ from various emissions (e.g., power plant emissions) and its sequestration (carbon capture and sequestration (CCS)) should not incur more than a minimum of additional energy consumption.

For example, conventional $CO_2$ absorption-stripping processes using aqueous monoethanolamine (MEA) solution can increase the cost of electricity (COE) generation substantially. As such, a reduction of steam regeneration cost, a major contributor to energy consumption, is needed among a few others contributing to the large increase in the COE.

In general, various flue gas $CO_2$ removal techniques are available. For example, amine absorption, adsorption, condensation, membrane permeation, and chilled ammonia-based processes have been investigated.

Membrane contactors have been studied for $CO_2$ removal. For example, Kosaraju et al. identified a reactive nonvolatile amine in an aqueous solution and studied $CO_2$ absorption and stripping using two separate polypropylene (PP) hollow fiber-based conventional membrane contactors for over 55 days. See, e.g., Kosaraju et al., Hollow Fiber Membrane Contactor Based $CO_2$ Absorption-Stripping Using Novel Solvents and Membranes, Ind. Eng. Chem. Res. 44 (2005) 1250-1258.

Li and Chen (Review of $CO_2$ Absorption Using Chemical Solvents in Hollow Fiber Membrane Contactors, Sep. and Purif. Technol. 41 (2005) 109-122) provide an earlier review of membrane contactors for $CO_2$ removal.

Ionic liquids have been studied as solvents for use in membrane contactors. Albo et al. studied $CO_2$ capture in the ionic liquid [emim][EtSO$_4$] using a polypropylene (PP) hollow fiber membrane contactor. See, e.g., Albo et al., Carbon Dioxide Capture from Flue Gases using a Cross-flow Membrane Contactor and the Ionic Liquid 1-Ethyl-3-methylimidazolium Ethyl sulfate, Ind. Eng. Chem. Res. 49 (2010) 11045-11051.

Gomez-Coma et al. studied the influence of temperature in $CO_2$ absorption in membrane contactors for two ionic liquids, [emim][EtSO$_4$] and [emim][Ac]. See, e.g., Gomez-Coma et al., Non-dispersive Absorption of $CO_2$ in [emim] [EtSO$_4$] and [emim][Ac]: Temperature Influence, Sep. and Purif. Technol. 132 (2014) 120-125.

Luis et al. (Non-dispersive Absorption for $CO_2$ Capture: From the laboratory to industry, J Chem. Technol. Biotechnol. 86 (2011) 769-75) identified four challenges for membrane contactor systems for $CO_2$ removal. These challenges are: avoid membrane wetting which decreases the performance in comparison with conventional systems; develop membranes demonstrating long-term stability (or develop cheap membranes that allow frequent replacement without high expenses); apply absorption liquids having properties that allow $CO_2$ recovery; and simultaneously minimize the environmental impact and study of the impact of other compounds on the process efficiency.

Favre and Svendsen (Membrane Contactors for Intensified Post-combustion Carbon Dioxide Capture by Gas-liquid Absorption Processes, J. Membrane Sci. 407-408 (2012) 1-7) suggested a methodology for a better comparison of membrane contactors for $CO_2$ removal. This methodology requires explicit consideration of the process intensification factor via an average volumetric $CO_2$ absorption capacity.

Zhang and Wang (Gas-Liquid Membrane Contactor for Acid Gas Removal: Recent Advances and Future Challenges, COCHE, 2(2) (2013) 255-262) have provided additional perspectives on the challenges for membrane contactors in $CO_2$ removal. This includes special considerations on prevention of pore wetting via small maximum pore size and narrow pore size distribution.

Li et al. employed a membrane contactor built out of hydrophobized microporous polyetheretherketone (PEEK) hollow fibers and demonstrated excellent $CO_2$ absorption performance using aqueous amine solutions (40 wt %). See, e.g., Li et al., Post-combustion $CO_2$ Capture using Superhydrophobic, Polyetheretherketone, Hollow Fiber Membrane Contactors, J. Membrane Sci. 430 (2013) 79-86.

Thus, an interest exists for improved systems, assemblies and methods to remove $CO_2$ from emissions, and related fabrication methods. These and other inefficiencies and opportunities for improvement are addressed and/or overcome by the systems, assemblies and methods of the present disclosure.

SUMMARY OF THE DISCLOSURE

The present disclosure provides advantageous systems, assemblies and methods to remove and recover $CO_2$ from emissions. More particularly, the present disclosure provides improved membrane contactors configured to remove $CO_2$ from flue gas by temperature swing absorption.

In general, conventional processes for $CO_2$ scrubbing from flue gas in a contactor using aqueous monoethanolamine (MEA) solution followed by steam-stripping with an intermediate heat exchanger for heating up the $CO_2$-loaded absorbent and cooling down the regenerated absorbent increase the cost of electricity enormously. To reduce the cost, the absorbent mass should be substantially reduced and the temperature swing range limited considerably so that cheaper utilities (hot water) can be used. Membrane contactors are generally compact and highly attractive for non-dispersive $CO_2$ absorption.

It is noted that Mulukutla et al. investigated reactive absorption of $CO_2$ in the ionic liquid [bmim] [DCA] containing 20 wt % polyamidoamine (PAMAM) dendrimer GenO (FIG. 1) and its regeneration by employing rectangular cross-flow hollow fiber modules made of porous fluorosiloxane-coated porous PP hollow fibers. See, e.g., Mulukutla et al., Novel Scrubbing System for Post-Combustion $CO_2$ Capture and Recovery: Experimental Studies, J. Membrane Sci. 471 (2014) 16-26.

In exemplary embodiments, the present disclosure provides a novel hollow fiber membrane contactor that integrates absorption and stripping using a nonvolatile reactive absorbent (e.g., 80% polyamidoamine (PAMAM) dendrimer generation 0, and 20% of an ionic liquid (IL)).

The present disclosure provides proof-of-concept experiments via a cyclic process, and provides a novel device containing two commingled sets of hollow fibers. Through the bores of one set of porous hydrophobic hollow fibers, flue gas is passed; $CO_2$ diffuses to the shell side to get reactively absorbed in the stagnant PAMAM dendrimer-IL on the shell side. After there is $CO_2$ breakthrough at the other end of the porous hollow fibers, feed gas flow is shut down. Through the bores of the second set of hollow fibers having a solid wall impervious to $H_2O$ and common gases under the conditions used, hot water is next supplied to heat the shell-side liquid absorbent and strip the absorbed $CO_2$. After a short period, stripped $CO_2$ is withdrawn through the bores of the first set of porous hollow fibers.

The present disclosure describes the performance of this temperature swing membrane absorption (TSMAB) process here with absorption at about 50° C. and stripping between about 85 and about 97° C. Equilibrium $CO_2$ absorption in the nonvolatile viscous mixed absorbent is as high as 6.37 mmol$CO_2$/g absorbent in the presence of moisture at 50° C. The $CO_2$ absorption and regeneration behavior of the integrated device has been studied for this absorbent at various absorption and regeneration temperatures, and device design changes/modifications are discussed.

In exemplary embodiments, the present disclosure provides for the development of $CO_2$ capture from flue gas using a novel temperature swing membrane absorption (TSMAB) technology/system employing amine absorbents (e.g., almost or substantially pure amine absorbents; almost or substantially pure low molecular weight amine absorbents) stagnant in a novel membrane contactor device/assembly and a cyclic $CO_2$ absorption-thermal stripping process. Some process goals involve obtaining 90% of the flue gas $CO_2$ recovered in a 95%+$CO_2$-containing stream; this is to be achieved at a cost of electricity (COE) 30% less than baseline capture approaches. For temperature swing processes employing absorbents/adsorbents, such an exemplary goal should have a minimum amount of a media having a high $CO_2$ sorption capacity, and a small possible temperature swing range using inexpensive energy sources such as hot water.

The present disclosure provides for a cyclic absorption-thermal stripping technique using a novel membrane contactor which has integrated the absorption and thermal stripping steps. It contains two sets of hollow fibers commingled and well packed in a cylindrical device with the shell side being substantially completely filled with a liquid absorbent for $CO_2$. One set of hollow fibers is porous and hydrophobic with the flue gas flowing through the bores of these hollow fibers for absorption of $CO_2$ into the absorbent on the shell side by diffusion through gas-filled pores. Initially, most of the $CO_2$ coming in with the flue gas is absorbed; the liquid absorbent bed gets saturated after some time and $CO_2$ breaks through the end of the hollow fibers. At this time, the inflow of flue gas is stopped and flow of hot water is initiated through the bores of the second set of solid nonporous water-vapor-impermeable hollow fibers to heat up the absorbent bed.

After the bed reaches a certain temperature high enough to strip the $CO_2$ effectively, the highly $CO_2$-enriched stream is allowed to flow out through the bores of the porous hollow fibers. Then cold water is passed through the bores of the solid hollow fibers to cool the bed down (e.g., to 50° C.) and allow flue gas to come in again for $CO_2$ scrubbing.

The present disclosure provides proof-of-concept experiments using the polyamidoamine (PAMAM) dendrimer Gen 0; and demonstrates success.

However, in certain embodiments, it is noted that the liquid absorbent PAMAM Gen 0 is viscous and can slow the mass transfer rate of $CO_2$ and therefore the working $CO_2$ absorption capacity even though it has a very high equilibrium $CO_2$ absorption capacity.

In some embodiments, the present disclosure provides for the enhancement of the mass transfer rate of $CO_2$ by selecting low molecular weight liquid amines (e.g., methyldiethanolamine (MDEA)) as the absorbent on the shell side of the assembly (e.g., the novel integrated hollow fiber assembly).

Exemplary embodiments achieve considerable mass transfer enhancement also by using a well-packed module containing hollow fibers of much smaller radial dimensions so that the absorbent liquid layer thicknesses in between the hollow fibers is considerably reduced and the gas flow channel volume is reduced a few times. There is a built-in connection on the shell-side to automatically replenish any trace losses of amines by volatilization. Such a configuration can use a small amount of absorbent media having a very high working $CO_2$ absorption capacity using a low-cost energy source (e.g., hot water) for stripping.

The present disclosure provides for a highly integrated absorption-stripping device/assembly which will require a much lower energy input to achieve some process goals of obtaining 90% of the flue gas $CO_2$ recovered in a 95%+ $CO_2$-containing stream at a cost of electricity (COE) 30% less than baseline capture approaches.

In general, the present disclosure provides for a novel transformational post-combustion $CO_2$ capture technique/system termed Temperature Swing Membrane Absorption (TSMAB). This technique/system is expected to make substantial progress towards meeting overall fossil energy performance goals of 90% $CO_2$ capture rate with 95% $CO_2$ purity at a cost of electricity (COE) 30% less than baseline capture approaches. Exemplary assemblies/devices employed in this cyclic technique integrate non-dispersive gas absorption via a porous hollow fiber membrane contactor with hot water based stripping of $CO_2$ absorbed in an almost pure amine. The compact integrated device/assembly and the novel absorbent can intensify the process to an extraordinary extent.

The present disclosure provides for a method to remove $CO_2$ from emissions including providing a housing; disposing a first plurality and a second plurality of hollow fibers in the housing, the first plurality of hollow fibers including porous wall hydrophobic hollow fibers and the second plurality of hollow fibers including solid wall hollow fibers; disposing an absorbent in the housing between the first and second plurality of hollow fibers; flowing feed gas through the first plurality of hollow fibers, the first plurality of hollow fibers configured to allow $CO_2$ from the feed gas to diffuse to and be absorbed in the absorbent; shutting down the flow of feed gas; flowing hot water through the second plurality of hollow fibers to heat the absorbent and strip the absorbed $CO_2$ into the first plurality of hollow fibers; and withdrawing the stripped $CO_2$ from the housing through the first plurality of hollow fibers.

The present disclosure also provides for a method to remove $CO_2$ from emissions wherein the feed gas is flowed through the first plurality of hollow fibers at about 50° C.;

and wherein the hot water is flowed through the second plurality of hollow fibers between about 85° C. and about 97° C.

The present disclosure also provides for a method to remove $CO_2$ from emissions wherein after the stripped $CO_2$ is withdrawn, the method further includes the step of flowing cold water through the second plurality of hollow fibers to cool the absorbent.

The present disclosure also provides for a method to remove $CO_2$ from emissions wherein the absorbent is a substantially pure low molecular weight amine absorbent. The present disclosure also provides for a method to remove $CO_2$ from emissions wherein the absorbent is selected from the group consisting of methyldiethanolamine, diethanolamine, aMDEA, primary amines, secondary amines, tertiary amines, hindered amines, oligomeric nonvolatile amines, polyamidoamine dendrimer generation 0, and mixtures thereof.

The present disclosure also provides for a method to remove $CO_2$ from emissions wherein the first and second plurality of hollow fibers include polymeric hollow fibers that are commingled with one another within the housing. The present disclosure also provides for a method to remove $CO_2$ from emissions wherein the second plurality of hollow fibers are substantially impermeable to moisture, $CO_2$, $N_2$ and $O_2$.

The present disclosure also provides for a method to remove $CO_2$ from emissions wherein the absorbent includes from about 5% to about 50% water; and wherein the housing is connected to a reservoir containing additional absorbent.

The present disclosure also provides for a method to remove $CO_2$ from emissions wherein the first plurality of hollow fibers includes hollow fibers having an outer diameter of about 290 μm and an inner diameter of about 240 μm, and having a wall porosity of from about 0.20 to about 0.80; and wherein the second plurality of hollow fibers includes hollow fibers having an inner diameter between about 250 μm and about 300 μm, and having a solid wall thickness between about 50 μm to about 75 μm.

The present disclosure also provides for a method to remove $CO_2$ from emissions wherein the first plurality of hollow fibers includes hollow fibers having a highly porous superhydrophobic fluorosiloxane coating on the outer diameter of the fibers.

The present disclosure also provides for a $CO_2$ absorption and stripping system including a housing; a first plurality and a second plurality of hollow fibers disposed in the housing, the first plurality of hollow fibers including porous wall hydrophobic hollow fibers and the second plurality of hollow fibers including solid wall hollow fibers; an absorbent disposed in the housing between the first and second plurality of hollow fibers; wherein after feed gas passes through the first plurality of hollow fibers, the first plurality of hollow fibers is configured to allow $CO_2$ from the feed gas to diffuse to and be absorbed in the absorbent; wherein after the $CO_2$ diffuses to and is absorbed in the absorbent, hot water passing through the second plurality of hollow fibers heats the absorbent and strips the absorbed $CO_2$ into the first plurality of hollow fibers, with the first plurality of hollow fibers configured to allow the stripped $CO_2$ to be withdrawn through the first plurality of hollow fibers.

The present disclosure also provides for a $CO_2$ absorption and stripping system wherein the absorbent is a substantially pure low molecular weight amine absorbent. The present disclosure also provides for a $CO_2$ absorption and stripping system wherein the absorbent is selected from the group consisting of methyldiethanolamine, diethanolamine, aMDEA, primary amines, secondary amines, tertiary amines, hindered amines, oligomeric nonvolatile amines, polyamidoamine dendrimer generation 0, and mixtures thereof.

The present disclosure also provides for a $CO_2$ absorption and stripping system wherein the first and second plurality of hollow fibers include polymeric hollow fibers that are commingled with one another within the housing. The present disclosure also provides for a $CO_2$ absorption and stripping system wherein the second plurality of hollow fibers are substantially impermeable to moisture, $CO_2$, $N_2$ and $O_2$.

The present disclosure also provides for a $CO_2$ absorption and stripping system wherein the absorbent includes from about 5% to about 50% water; and wherein the housing is connected to a reservoir containing additional absorbent.

The present disclosure also provides for a $CO_2$ absorption and stripping system wherein the first plurality of hollow fibers includes hollow fibers having an outer diameter of about 290 μm and an inner diameter of about 240 μm, and having a wall porosity of from about 0.20 to about 0.80. The present disclosure also provides for a $CO_2$ absorption and stripping system wherein the second plurality of hollow fibers includes hollow fibers having an inner diameter between about 250 μm and about 300 μm, and having a solid wall thickness between about 50 μm to about 75 μm.

The present disclosure also provides for a $CO_2$ absorption and stripping system wherein the first plurality of hollow fibers includes hollow fibers having a highly porous superhydrophobic fluorosiloxane coating on the outer diameter of the fibers.

The present disclosure also provides for a method to remove $CO_2$ from emissions including providing a cylindrical housing; disposing a first plurality and a second plurality of polymeric hollow fibers in the cylindrical housing, the first plurality of polymeric hollow fibers including porous wall hydrophobic hollow fibers and the second plurality of polymeric hollow fibers including solid wall hollow fibers, the first and second plurality of polymeric hollow fibers commingled with one another within the cylindrical housing; disposing an amine absorbent in the cylindrical housing between the first and second plurality of polymeric hollow fibers; flowing flue gas through the first plurality of polymeric hollow fibers, the first plurality of polymeric hollow fibers configured to allow $CO_2$ from the flue gas to diffuse to and be absorbed in the amine absorbent; shutting down the flow of flue gas; flowing hot water through the second plurality of polymeric hollow fibers to heat the amine absorbent and strip the absorbed $CO_2$ into the first plurality of polymeric hollow fibers; withdrawing the stripped $CO_2$ from the cylindrical housing through the first plurality of polymeric hollow fibers; and flowing cold water, after the stripped $CO_2$ is withdrawn, through the second plurality of polymeric hollow fibers to cool the amine absorbent.

Any combination or permutation of embodiments is envisioned. Additional advantageous features, functions and applications of the disclosed systems, assemblies and methods of the present disclosure will be apparent from the description which follows, particularly when read in conjunction with the appended figures. All references listed in this disclosure are hereby incorporated by reference in their entireties.

BRIEF DESCRIPTION OF THE DRAWINGS

Features and aspects of embodiments are described below with reference to the accompanying drawings, in which elements are not necessarily depicted to scale.

Exemplary embodiments of the present disclosure are further described with reference to the appended figures. It is to be noted that the various steps, features and combinations of steps/features described below and illustrated in the figures can be arranged and organized differently to result in embodiments which are still within the scope of the present disclosure. To assist those of ordinary skill in the art in making and using the disclosed systems, assemblies and methods, reference is made to the appended figures, wherein:

(FIG. 9A) during $CO_2$ absorption from flue gas at 50° C.; (FIG. 9B) during heating of the bed for $CO_2$ desorption; (FIG. 9C) during cooling of the hot bed to get it ready for absorption again (temperature gradient along the bed length is being ignored for the time being)

DETAILED DESCRIPTION OF DISCLOSURE

Figure 1:
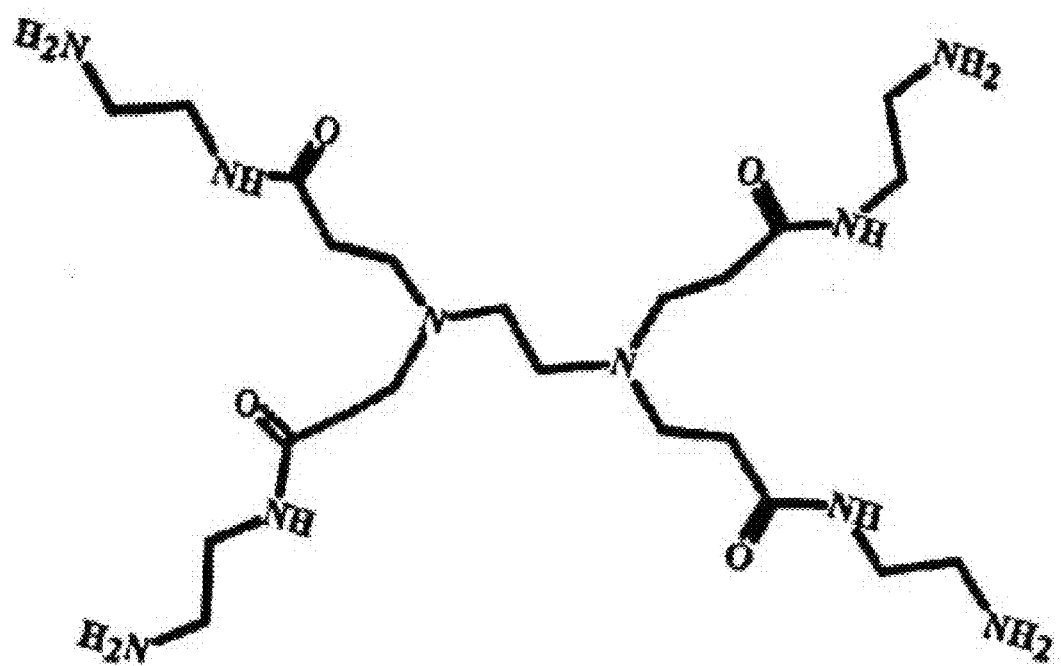
FIG. 1 shows the structure of PAMAM dendrimer Generation 0.

The exemplary embodiments disclosed herein are illustrative of advantageous assemblies to remove and recover $CO_2$ from emissions, and systems of the present disclosure and methods/techniques thereof. It should be understood, however, that the disclosed embodiments are merely exemplary of the present disclosure, which may be embodied in various forms. Therefore, details disclosed herein with reference to exemplary assemblies/fabrication methods and associated processes/techniques of assembly and use are not to be interpreted as limiting, but merely as the basis for teaching one skilled in the art how to make and use the advantageous assemblies/systems and/or alternative assemblies/systems of the present disclosure.

The present disclosure provides improved systems, assemblies and methods to remove and recover $CO_2$ from emissions. More particularly, the present disclosure provides advantageous membrane contactors configured to remove $CO_2$ from flue gas by temperature swing absorption.

Current practice provides that the development of a low-cost technology for post-combustion $CO_2$ capture from flue gas emitted by pulverized coal (PC)-fired power plants is of great interest. However, conventional $CO_2$-absorption technology using an aqueous amine solution for carbon capture and sequestration (CCS) is prohibitively costly. In exemplary embodiments, the present disclosure advantageously provides for a novel energy-efficient highly integrated compact hollow fiber membrane-based absorption-stripping device/assembly used with a novel absorbent in a low-cost cyclic process, thereby providing a significant operational, commercial and manufacturing advantage as a result.

The present disclosure provides for the development of a novel Temperature-Swing Membrane Absorption (TSMAB) technique/system for post-combustion $CO_2$ capture from flue gas emitted by pulverized coal (PC) power plants. Conventional $CO_2$ absorption-stripping processes using aqueous monoethanolamine (MEA) solution increases the COE substantially; reduction of steam regeneration cost, a major contributor to energy consumption, is needed among a few others contributing to the large increase in the COE. The capital and operating costs of the utilities for CCS can be reduced via the following: (i) employ a compact device integrating multiple functions/approaches and achieve process intensification, which reduces capital and energy cost and the footprint; (ii) reduce the heat used for regenerating the sorbent for adsorption or the solvent for absorption; (iii) avoid high-cost energy, e.g., electricity (for high vacuum in membrane processes), and/or use low cost utilities e.g., hot water in thermal-swing adsorption and absorption-stripping; and (iv) avoid using high vacuum requiring large vacuum pumps.

In exemplary embodiments, the present disclosure provides a novel hollow fiber membrane contactor that integrates absorption and stripping using a nonvolatile reactive absorbent (e.g., almost pure amine absorbents; DEA; MDEA; aMDEA; 80% polyamidoamine (PAMAM) dendrimer generation 0, and 20% of an ionic liquid; etc.).

In general, conventional MEA scrubbing processes involve a $CO_2$ absorber followed by a heat exchanger where the $CO_2$-loaded absorbent is heated up for $CO_2$ release in the subsequent steam stripper. The hot $CO_2$-stripped absorbent leaving the steam stripper is then cooled down in the heat exchanger used to heat up the $CO_2$-loaded absorbent. The thermal energy required in such processes involving $CO_2$ absorbents (as well as for reactive processes) is due to the heat of reaction and the sensible heat needed for the temperature swing process: $\Delta H_{reaction}+m\,C_p\Delta T$ where $\Delta T$ is the difference between the high and the low temperature, $C_p$ is the specific heat of the absorbent and m is the mass under consideration.

To reduce the level of energy consumption for a given amount of $CO_2$ captured, the present disclosure provides that one should reduce the mass of the absorbent and the temperature swing range $\Delta T$. The present disclosure looks for among others a sorbent/absorbent which has a high $CO_2$ sorption/absorption capacity. In such processes, there are other nonreactive materials which consume energy, e.g., the porous inactive substrate in adsorbent, water in absorption-stripping processes using aqueous solutions. Reduction of the mass of such substances especially water which gets evaporated during stripping processes will lead to a reduction in the energy needs. It can also lead to significant process intensification. In such temperature-swing between a high $T_h$ and a low $T_l$, the closer is $T_l$ to $T_h$, the lower is the other estimate of energy consumption-called the net work consumption. The Department of Energy (DOE) baseline report provides a platform for developing an overview of the calculations. See, e.g., Cost and Performance Baseline for Fossil Energy Plants. Bituminous Coal and Natural Gas to Electricity, Vol. 1, NETL Technical Report No. DOE/NETL-2007/1281, August 2007, http://www.net1.doe.gov/energy-analyses/pubs/Bituminous%20Baseline_Final%20Report.pdf. In general, cyclic adsorption of gases/vapors from a gaseous stream is practiced in large scale in one of four ways depending on the adsorbent bed regeneration method: pressure swing adsorption (PSA), temperature swing adsorption (TSA), inert purge, and displacement method. TSA-based regeneration of $CO_2$ adsorbents is being studied for CCS. In a simple case, there are two beds, one adsorbing $CO_2$ from flue gas; the other being thermally regenerated (there may be more beds, e.g., one bed will be cooling down before starting adsorption and the other being heated up for desorption). One of the keys to success will be an adsorbent with a high $CO_2$ sorption capacity and a high $CO_2$—$N_2$ selectivity; yet it should be capable of regeneration at a low temperature (e.g., with hot water). The $CO_2$ sorption capacity should be high: the heating and cooling load (therefore cost) is essentially inversely proportional to the sorption capacity. Further the temperature rise needed to strip the $CO_2$ should be as low as possible. The large void space in the adsorber (around 74% for zeolites) tends to limit the recovery of the strongly adsorbed species, $CO_2$: the bed void volume should also be reduced. The selectivity of zeolite sorbents for $CO_2$ over $N_2$ is also limited; $CO_2$-reactive sorbents are more useful.

It is noted that changing of an aqueous solution to an ionic liquid-based solvent eliminates the deficiency of water evaporation with conventional absorbents. However, the absorbent mass is still very large. It is noted that if one employs a nonvolatile reactive absorbent with a high $CO_2$ absorption capacity, then one can reduce the absorbent mass drastically. Of course, such an absorbent will have a high viscosity. In certain embodiments, the present disclosure utilized PAMAM dendrimer Gen 0 diluted by an IL present at 20% level.

It is noted that previous studies proposed a supported liquid membrane of this compound as a molecular gate for selective $CO_2$ removal. See, e.g., Kovvali et al., Dendrimer Membranes: A $CO_2$-selective Molecular Gate, J. Am. Chem. Soc. 31 (2000) 7594-7595. At room temperature, it yielded an extremely high $CO_2$—$N_2/O_2$ selectivity in the range of 700-18,000 depending on the $CO_2$ partial pressure. This performance was achieved in the presence of considerable moisture on the feed side needed to activate the tertiary amine groups in the dendrimer which has four primary amines and two tertiary amines (FIG. 1).

Further research work has developed successful $CO_2$ separation membranes using this amine in particular ways and scaled it up; however such membranes need considerable vacuum on the permeate side. See, e.g., Duan et al., Development of PAMAM Dendrimer Composite Membranes for $CO_2$ Separation, J. Membrane Sci. 283(2006) 2-6; Kouketsu et al., PAMAM Dendrimer Composite Membrane for $CO_2$ Separation: Formation of a Chitosan Gutter Layer, J. Membrane Sci. 287 (2007) 51-59; Taniguchi et al., Facile Fabrication of a Novel High Performance $CO_2$ Separation Membrane: Immobilization of Poly (amidoamine) Dendrimers in Poly (ethylene glycol) Networks, J. Membrane Sci. 322 (2008) 277-280; and Duan et al., Poly (amidoamine) Dendrimer/poly (vinyl alcohol) Hybrid Membranes for $CO_2$ capture, J. Membrane Sci. 423 (2012) 107412.

To accommodate such a compound as an absorbent, the present disclosure proposes a novel membrane contactor concept/assembly for $CO_2$ removal and recovery. The present disclosure provides the strengths of such a contactor here via a proof-of-concept study.

Figure 2:
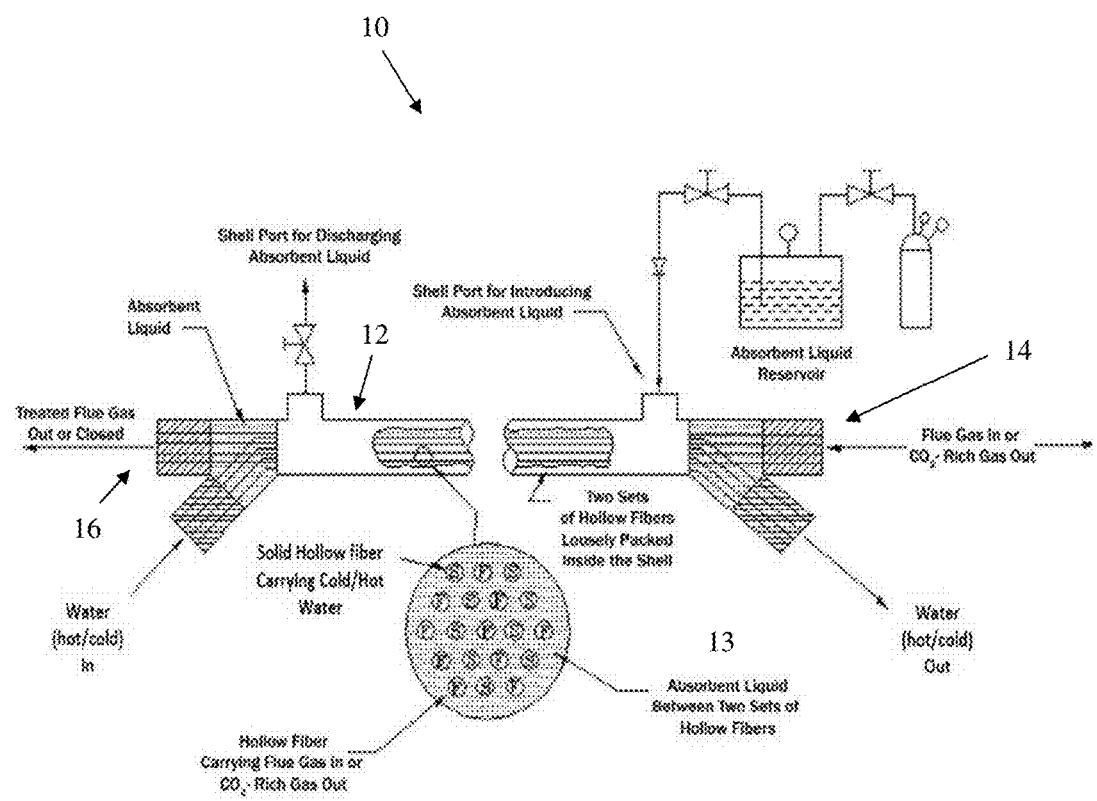
FIG. 2 is a schematic of an exemplary two hollow fiber set-based cylindrical temperature swing membrane absorption (TSMAB) assembly.

Temperature Swing Membrane Absorption Process and a Novel Hollow Fiber Contactor:

Turning to FIG. 2, the present disclosure next describes the cyclic process concept and the novel assembly 10 where the temperature-swing membrane absorption (TSMAB) process (instead of an adsorption process) can be implemented.

In exemplary embodiments, the temperature-swing absorption assembly 10 includes a shell or housing 12 (e.g., cylindrical shell/housing 12) inside which two sets of polymeric hollow fibers (S, F) having thin walls are commingled thoroughly.

The first set of hollow fibers F has highly porous walls; the polymer is hydrophobic. The second fiber set consists of solid hollow fibers S with nonporous walls impermeable to moisture and the gases (e.g., $CO_2$, $N_2$, $O_2$) under the conditions of use.

The space (e.g., shell-side space) between the two hollow fiber sets (S, F) is filled with a nonvolatile (preferably) organic $CO_2$-reactive liquid amine 13 (e.g., occupying around 60% of the bed volume). In exemplary embodiments, the liquid amine 13 should not wet the pores of the hydrophobic hollow fibers (F). This amine 13 could be an almost pure amine or a mixture of almost pure amines so that the reactive $CO_2$ absorption capacity and reaction rates are extremely high. Further, the $CO_2$—$N_2$ selectivity of this absorbent 13 is very high. In general, there will be a bit of water present in this liquid because the flue gas is moist. In other embodiments, it is noted that the absorbent can include from about 5% to about 50% water.

When flue gas is passed through the bores of the porous hollow fibers F for a brief period, $CO_2$ from the flue gas will diffuse through the pores and get absorbed in the (shell-side) stagnant liquid amine 13. In such a gas-liquid contacting configuration (FIG. 2), the polymeric hollow fibers F provide 5-10 times larger gas-liquid contacting area/volume than conventional packed beds used for gas absorption/adsorption.

Once the liquid amine bed 13 gets saturated with $CO_2$, the $CO_2$ will break through the other end of the lumen of the porous hollow fibers F. Then flue gas inflow can be stopped.

Hot water can be brought into the bores of the second set of solid hollow fibers S to heat the liquid absorbent 13 on the shell side in between the two hollow fiber sets (S, F). During the flow of hot water, absorbed $CO_2$ will be stripped from thin liquid layers into the bores of the porous hollow fibers F and later taken out through flue gas entrance 14 or the opposite end 16.

After $CO_2$ stripping is completed, colder water is passed through the bore of the second set of solid hollow fibers S to cool down the bed and/or absorbent 13 in the assembly 10 and prepare the bed 13 for the next cycle of $CO_2$ absorption. When the next cycle begins with feed flue gas flowing through the bores of the porous hollow fibers F, cold water flow through the bores of the solid hollow fibers S is continued to absorb any exothermic heat of reaction of $CO_2$ during absorption in the shell-side amines. This raises the temperature of the water which is to be heated for the next stripping step.

In exemplary embodiments, there will be four such modules for the cyclic operation. One module will absorb $CO_2$ from flue gas. The next one will be getting heated up for desorption. A third one which is already heated up will undergo desorption of $CO_2$. The fourth one which is hot and which has undergone $CO_2$ desorption will get cooled down for the next cycle of absorption, heating, stripping, cool down.

In exemplary embodiments, it is noted that this is not a membrane process. The first set of porous hollow fibers F is for distribution of the flue gas in very thin mobile elements just as the shell-side stagnant liquid prepared primarily from amines is distributed into very thin long stagnant elements in between the hollow fibers (S, F). The first set of hollow fibers F acts like the gas flow channels existing between adsorbent particles in a conventional adsorbent bed. It also acts as a support for developing the shell-side liquid 13 into ultra-thin liquid strips. The second set of impervious hollow fibers S supply hot water to heat up the liquid absorbent bed 13 rapidly; it is impermeable to moisture, $CO_2$, $N_2$, and $O_2$. When $CO_2$ is absorbed by the amine 13, it is then a process of time dependent fast reactive gas absorption followed by time-dependent desorption at a higher temperature. There is no facilitated transport membrane. Further there is no contained liquid membrane. The assembly 10 integrates non-dispersive gas absorption via a porous hollow fiber membrane contactor with hot water-stripping of the $CO_2$ absorbed in an amine absorbent 13 via another set of solid hollow fibers S; further the absorption capacity and process will be strongly enhanced by using an almost pure amine. The gaseous bed void volume in the porous absorption hollow fiber bores can be reduced to less than 20% leading to a compact device/assembly achieving high process intensification.

FIG. 2 of the separation assembly 10 shows that the shell-side liquid 13 is connected to a mildly pressurized reservoir containing the shell-side liquid 13. Loss of the shell-side amine activity due to interaction with trace $SO_2$ in the flue gas or a very slow thermal degradation can be counteracted periodically by controlled bleeding of this liquid 13 and automatic fresh liquid transfer from the reservoir without interrupting the operation. The rejected liquid can be treated to remove heat stable amine salts (from reaction with $SO_2$) and recycled. Small leaks and shell-side liquid loss is immediately counteracted by the liquid reservoir. Solid adsorbent-based processes with reactive amines immobilized/grafted in adsorbents lack such features of replacement without interrupting operation.

As shown in FIG. 2, assembly 10 also includes a shell port for discharging absorbent liquid 13, a shell port for introducing absorbent liquid 13, a water outlet, and a water inlet.

In further embodiments, the inside radius of the porous hydrophobic hollow fibers have amine functionalized surfaces with the outside surfaces of the porous hollow fiber remaining hydrophobic. In yet further embodiments, the outside surface of the solid hollow fibers used for heat transfer are functionalized for $CO_2$ sorption and desorption.

It is noted that such hollow fiber modules with two sets of hollow fibers of different kinds, one porous hydrophobic and the other nonporous, is complex. In exemplary embodiments, the shell-side $CO_2$— reactive absorbent liquid between the two sets of hollow fibers (S, F) is nonvolatile so that there is no substantial loss especially during the hot-water heating step. If these liquids are not nonvolatile, it is important that they are high boiling so that very little loss is encountered during the short hot water heating period. Such loss would be automatically taken care of by the module 10 design and its connection to an external reservoir of the amine liquid.

A variety of amines can be used including mixtures of primary, secondary and tertiary amines as well as hindered amines. Oligomeric nonvolatile amines (e.g., polyamidoamine (PAMAM) dendrimer Gen 0 (MW, 517 dalton) (FIG. 1)) may also be employed.

Lower MW amines with a much lower viscosity may be needed to reduce the mass transfer resistance: e.g., diethanolamine (DEA), methyldiethanolamine (MDEA), aMDEA (contains small amount piperazine (PIP) as a promoter). Moisture from flue gas (which has a high humidity) will be absorbed into this liquid; this moisture is generally needed to engage the reactivity of the tertiary amines. To start with there may be a 5-10%+ water as a diluent in such an amine liquid or a mixture of amine-liquids; this is relevant especially if one utilizes tertiary amines (e.g., MDEA).

It has been demonstrated that at 25° C. a supported liquid membrane (SLM) of pure PAMAM dendrimer Gen 0 (MW, 517 dalton) functioned as a molecular gate for selective $CO_2$ removal: it had a high selectivity for $CO_2$ over $N_2/O_2$ in the range of 700-18,000 depending on the $CO_2$ partial pressure. Successful $CO_2$-selective membranes (selectivity of 400 at 40° C.) using this amine for flue gas has been developed and scaled up. In general, conventional membrane separation needs high vacuum, large vacuum pumps and electricity for the desired $CO_2$ purity in the permeate. Therefore thermally-driven sorption processes using such and other amines are of interest.

Consider now the maximum $CO_2$ absorption capabilities of PAMAM dendrimer Gen 0 (FIG. 1): there are four primary amine groups and two tertiary amine groups. In the presence of moist flue gas, two tertiary amine groups will consume ideally two molecules of $CO_2$. Also the four primary amine groups will consume two molecules of $CO_2$ in collaboration with neighboring molecules. Then ideally one PAMAM Gen 0 molecule can consume four molecules of $CO_2$ (see Eqs. 1 and 2, reproduced below in Example 1).

This amounts to 7.72 mmol of $CO_2$/g of PAMAM. If one uses 80% PAMAM and 20% polar nonvolatile diluent (e.g., PEG 400 or an ionic liquid (IL)), the dendrimer absorption capacity will be around 6.17 mmol $CO_2$/g of absorbent liquid. It is noted that SLMs of PAMAM containing various amounts of polar diluents have been fabricated.

Figure 4A:
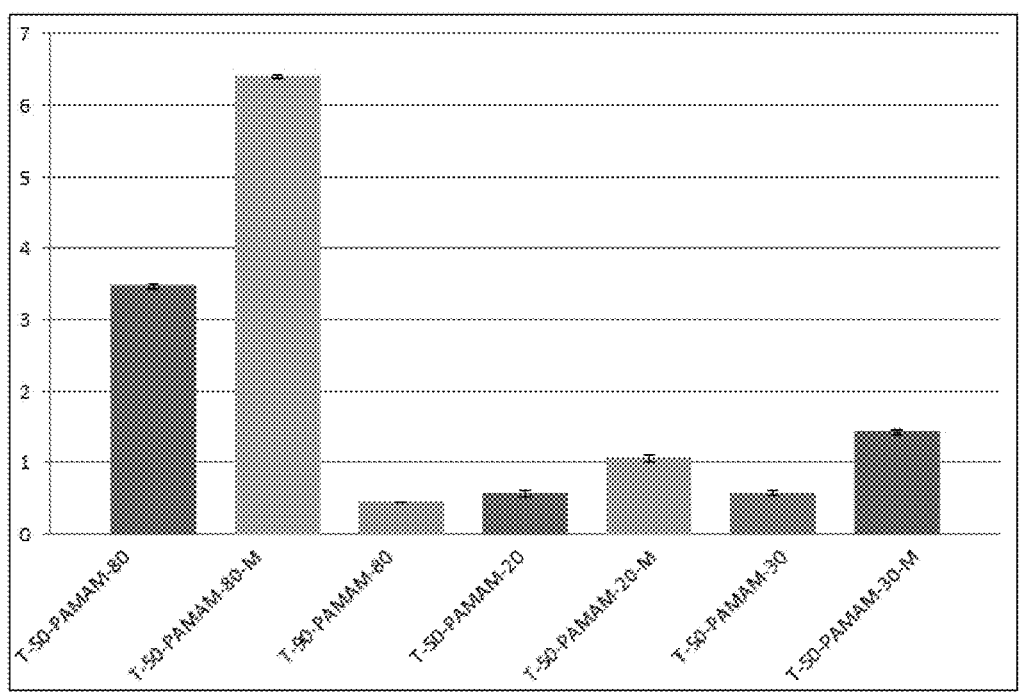
FIG. 4A shows the absorbent capacity in mmol of $CO_2$/g absorbent. The symbol T50-PAMAM-80-M stands for: The temperature was 50° C.; PAMAM was present at 80 wt % level in [bmim] [DCA]; M specifies that moisture was present. The $CO_2$ partial pressure for the reported equilibrium $CO_2$ absorption capacity was 4 bar.

FIG. 4A illustrates data on equilibrium $CO_2$ absorption capacity of this amine at 50° C. at different dilutions in an IL e.g., 20, 30, 80 wt % w/without moisture. The IL diluent was 1-butyl-3-methylimidazolium dicyanamide, [bmim][DCA]. The data for 20 and 30 wt % has been published: the absorbent capacity is indicated with respect to the whole absorbent mixture. The 80 wt % data was acquired; and the present disclosure reports the absorption per g of PAMAM by subtracting that due to the IL. The results show that the equilibrium $CO_2$ absorption capacity of this amine is very high. However the hollow fiber support mass should be factored in (considered later). Another nonvolatile diluent is polyethylene glycol 400 (PEG 400); preliminary data indicate that its $CO_2$ solubility is even higher than that of the IL used. However both have high viscosity.

FIG. 4A shows that the absorbent liquid's $CO_2$ sorption capacity of 0.45 mmol/g absorbent at 90° C. is more than an order of magnitude smaller than that at 50° C. Therefore, without heating the absorbent to a high temperature, $CO_2$ can be desorbed reducing the energy needed. The amount of absorbent and related support should be reduced; the temperature swing should also be minimized reducing the net work consumption. Hot water for stripping is very useful for existing coal-based power plants.

The present disclosure now indicates for the sake of comparison data from adsorbents. Ma et al. (Molecular Basket Sorbents for Separation of $CO_2$ and $H_2S$ from Various Gas Streams. J. Am. Chem. Soc., 2009, 131, 5777-83) employed a molecular basket sorbent to achieve 140 mg $CO_2$/g of sorbent at 15 kPa $CO_2$ partial pressure; this amounts to 3.18 mmol $CO_2$/g of sorbent which was claimed to be higher than those of other sorbents including those from zeolitic imidazolate frameworks.

Hicks et al. (Designing Adsorbent for $CO_2$ Capture from Flue Gas—Hyperbranched Aminosilicas Capable of Capturing $CO_2$ Reversibly, J. Am. Chem. Soc., 2008, 130, 2902-3) achieved 3.1 mmol $CO_2$/g of the hyperbranched aminosilica material at around 25° C.

Choi et al. (Adsorbent Materials for Carbon Dioxide Capture from Large Anthropogenic Point Sources, ChemSusChem, 2009, 2, 796-854) employed silica supported poly(ethyleneimine) (PEI) materials containing 45 wt % PEI (PEI/silica) as well as those based on modified PEI via impregnation and demonstrated a promising adsorbent capacity of 2.36 mmol$CO_2$/g sorbent.

Goeppert et al. (Carbon Dioxide Capture from the Air Using a Polyamine Based Regenerable Solid Adsorbent, J. Am. Chem. Soc., 2011, 133, 20164-67) reported 1.74 mmol/g adsorbent FS-PEI-33 (branched polyethylenimine (PEI) coated on fumed silica) under humid conditions and claimed it to be the highest value (higher than that for hyperbranched aminosilica) with a 36% amine content.

Stuckert and Yang ($CO_2$ Capture from the Atmosphere and Simultaneous Concentration Using Zeolites and Amine-Grafted SBA-15, Environ. Sci. Technol., 2011, 45, 20164-67) found zeolite type Li-LSX the best among a few sorbents including amine-grafted microporous silica with a measured capacity of 0.82 mmol/g for low $CO_2$ concentration in air; however this value is based on dry air since this particular zeolite loses its sorption capacity under moisture.

Pacheco et al. (Aminosilane-Functionalized Cellulosic Polymer for Increased $CO_2$ Sorption, Ind. Eng. Chem. Res., 2012, 51, 503-14) obtained 1.46 mmol $CO_2$/g adsorbent at 5 atm/308 K in an aminosilane-functionalized cellulosic polymer sorbent.

Kuwahara et al. (Dramatic Enhancement of $CO_2$ Uptake by Poly(ethyleneimine) using Zirconosilicate Supports, J. Am. Chem. Soc., 2012, 134, 10757-60) studied $CO_2$ adsorption characteristics of prototypical poly (ethyleneimine)/silica composite adsorbents whose sorption capacity was enhanced by altering the acid/base properties of the oxide support by introducing Zr into the silica support. The highest values were around 2.0 mmol$CO_2$/g sorbent.

Such efforts vis-à-vis various adsorbents have focused on grafting, impregnating or immobilizing preformed polymeric amines of various types on porous solid supports/adsorbents having beneficial characteristics or an inert behavior. The absolute $CO_2$ adsorption capacity of such supported basic groups/g of the adsorbent material is considerably reduced by the support mass. Temperature swing adsorbent regeneration will involve heating of this support mass which does not generally contribute to $CO_2$ adsorption. If the contribution of the support to the total mass under consideration can be reduced considerably, then the energy load to heat the support for desorption can also be reduced.

As discussed further below in Example 1, free surface model-based analysis (FIG. 5) suggests assuming around a hollow fiber outside diameter (OD) an effective liquid layer whose OD is $2r_e$. The ratio of the heat capacity of this liquid layer around the hollow fibers (of OD, $2r_o$ and internal diameter (ID), $2r_i$) to the heat capacity of this liquid layer plus the hollow fiber walls (half of the hollow fibers are porous with a wall porosity $\epsilon_f$ of say, 0.60; the other half is nonporous) is given by Equation 3 reproduced in Example 1 below.

The specific heat $C_P$ of the polymers is around 0.35 cal/g-° C. (both $C_{P,p}$ for the solid hollow fibers and $C_{P,f}$ for the porous hollow fibers); that for the organic liquid is around 0.55 cal/g-° C. If one assumes $r_o$ and $r_i$ to be 287 and 213 μm. Assuming the effective liquid film thickness between neighboring fibers to be around 500 μm, $r_e$ is around 537 μm. Assume 1.2 g/cm$^3$ to be the density of the liquid; that for the polymer is 0.94 g/cm$^3$. The ratio in (Eq. 3) turns out to be 0.94 e.g., the polymers in the thin walls of the two types of fibers add about 6% more heat capacity to the liquid layer.

If one now removes the specific heats from the various terms in (Eq. 3), one gets the increase in the liquid mass due to the two sets of hollow fibers; that value is 0.91 e.g., the hollow fibers increase the total mass over that of the liquid by about 9%. Therefore the $CO_2$ absorption capacity reported will be reduced by about 9% from the value of 6.17 mmol of $CO_2$/g of 80% PAMAM absorbent. This rough calculation provides an energy advantage estimate of pure/almost pure amine liquid absorbent vis-à-vis microporous aminosilica adsorbents listed above, provided the working $CO_2$ sorption capacity is also quite high.

Indeed, some further research will be directed to that end, namely substantially enhancing the working absorption capacity. The liquid absorbent has not been compared with zeolite adsorbents since the PEI-based adsorbents have higher capacity. If the values of $r_o$ and $r_i$ are reduced due to smaller diameters of the hollow fiber, then the ratio in (Eq. 3) will be decreased somewhat more; but the reduction due to the hollow fiber support mass will still be no more than 15%.

Figure 7:
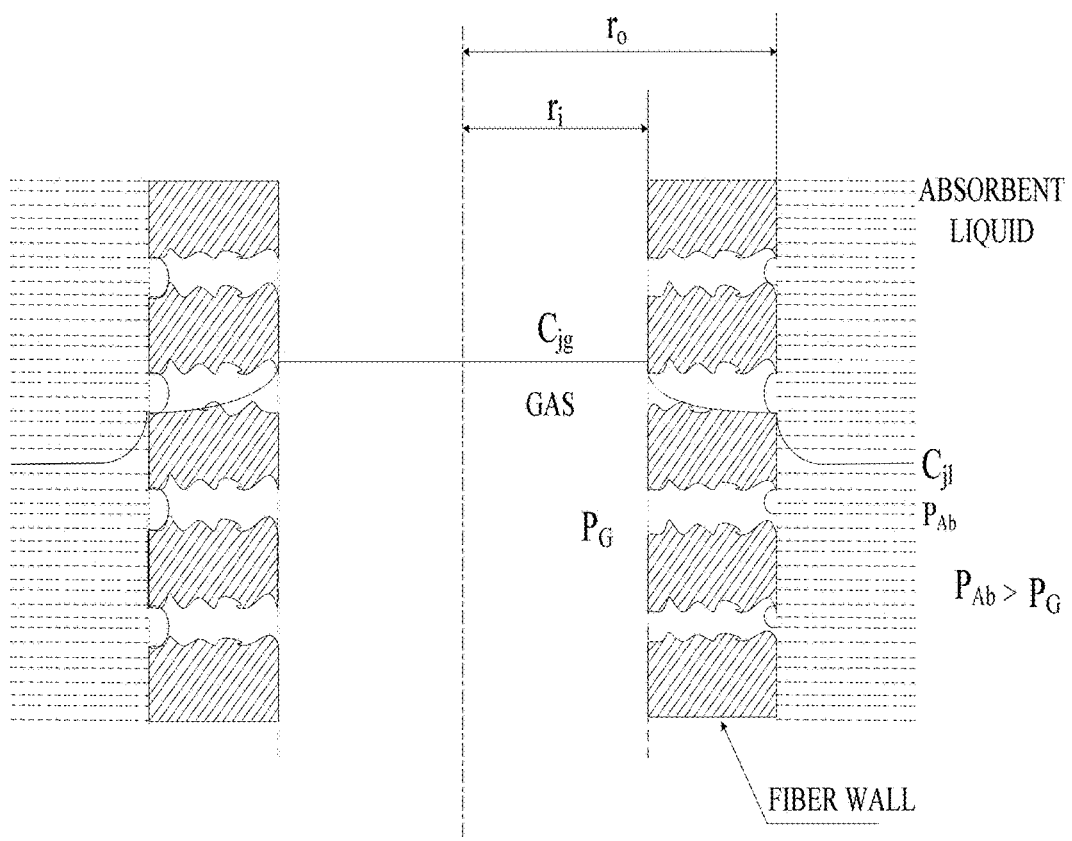
FIG. 7 shows concentration profiles for gas absorption in a porous hollow fiber membrane contactor.

The instantaneous species concentration profile in the gas flowing through a porous hollow fiber is shown in FIG. 7. The flue gas flowing in the hollow fiber bore contacts the shell-side absorbent at the pore mouth where the gas-liquid interface is located. The shell-side liquid pressure is slightly higher than that of the flue gas flowing at around 1 atm to prevent gas bubbling in the shell-side absorbent liquid.

Example 1 below shows exploratory results of $CO_2$ breakthrough during absorption from dry flue gas (FIG. 6A) and wet flue gas (FIG. 6B) flowing through the bore of the porous hydrophobic polyvinylidene fluoride (PVDF) hollow fibers (OD/ID, 925/691 μm; porosity, 0.52). The polyetheretherketone (PEEK) solid hollow fiber dimensions were: OD/ID, 575/420 μm. The shell-side space in between the fibers were filled with 80 wt % PAMAM dendrimer Gen 0 in the IL [bmim][DCA].

In a small cylindrical module with active hollow fiber length of 35.5 cm and 11 hollow fibers of each kind, dry/humidified flue gas containing 14% $CO_2$, 2% $O_2$, balance $N_2$ was introduced into the bore of the PVDF hollow fibers for a certain length of time. The $CO_2$ content of the gas exiting at the opposite end of the hollow fibers was measured as a function of time.

Initially there was no $CO_2$ at the exit end; $CO_2$ appeared after 2 to 12.1 min depending on the dry/wet flue gas flow rate; then the $CO_2$ concentration rose close to the feed gas level indicating feed breakthrough.

The values are lower for dry flue gas since the tertiary amines are generally not activated without moisture. In this module, the fiber ODs were very high; the fiber packing density was very low. The amine liquid layers were very thick around 1500-2000 μm; a very large part of this amine liquid layer was far from saturation during breakthrough. Densely packed hollow fiber modules with fibers having a much smaller OD will have much thinner liquid layers and a much sharper and quicker breakthrough. The viscosity of the amine is also an item to be considered to achieve faster diffusion. One should know the process dynamics via modeling. In practice, one may stop at 1.4% $CO_2$ for the 90% $CO_2$ recovery desired.

After the absorption part of the cycle was over, the stripping part of the cycle was initiated. To initiate temperature swing $CO_2$ desorption via absorbent regeneration, hot water was first passed for 10 min through the bore of the PEEK solid hollow fibers; the bed temperature rose quickly. The module-end thermocouples ensured that the bed temperature was maintained at the desired level.

After 10 min, the inlet and the outlet valves connected to the porous PVDF hollow fibers were quickly opened; a He sweep stream was passed through the porous hollow fiber bore at around 5-12.5 $cm^3$/min.

Absorbent regeneration was studied at bed temperatures of 85, 90, 95 and 97° C. by measuring the $CO_2$ concentration in the sweep He stream. Table 2 reproduced below in Example 1 summarizes the results for dry and wet simulated flue gas for various sweep He flow rates. As the He sweep flow rate was reduced, the sweep He stream $CO_2$ concentration increased. However, too low a He flow rate reduced the extent of stripping. The results show the quality of the stripped $CO_2$ stream. The highest $CO_2$ concentration in the He sweep was around 45% $CO_2$. In certain embodiments, one should not have sweep gas to generate the desorbed $CO_2$ stream containing 95% $CO_2$ in the proposed device/assembly.

Referring back to FIG. 2 and in certain embodiments, the present disclosure employs such an assembly 10 whose shell side is filled with an absorbent 80% of which consists of the nonvolatile amine, PAMAM dendrimer generation 0 and 20% consists of the ionic liquid 1-butyl-3-methyl-imidazolium dicyanamide ([bmim][DCA]). The present disclosure will describe first the equilibrium absorption capabilities of this absorbent. The present disclosure illustrates how this absorbent functions in a temperature swing process over a temperature range of 50-97° C. The present disclosure illustrates that transient $CO_2$ absorption in the absorbent followed soon by feed $CO_2$ concentration breakthrough after which the bed undergoes rapid heating by hot water to strip the absorbed $CO_2$.

Most absorbents used for $CO_2$ removal from flue gas are aqueous solutions containing varying amounts of different amines (usually up to 40%) or $K_2CO_3$ etc. By using an absorbent that is at least 80% amines, the present disclosure reduces the amount of absorbent considerably. Correspondingly, the amount of $CO_2$ absorbed per unit weight of the absorbent is enhanced considerably. Secondly, conventional contacting operation goes for a certain fractional removal of $CO_2$ from the flue gas. The operation or design does not focus on saturation of the absorbent with $CO_2$. In the mode of operation proposed, $CO_2$ breakthrough under ideal conditions will indicate almost complete saturation of the reactive absorbent. Therefore, utilization of the inherent reactive absorption capability of the absorbent is likely to be much higher in the disclosed scheme. If one ends up with very thin liquid layers in between the two sets of hollow fibers (S, F), when flue gas carbon dioxide breakthrough occurs, one may assume that the liquid layers are almost fully saturated with $CO_2$.

The present disclosure will be further described with respect to the following examples; however, the scope of the disclosure is not limited thereby. The following examples illustrate the advantageous systems, assemblies and methods of the present disclosure configured to remove $CO_2$ from emissions.

Example 1

Chemicals

The PAMAM dendrimer (Gen 0) (MW, 517) (Dendritech, Midland, Mich.) was received as a dendrimer-methanol solution having a dendrimer concentration of 64.05 wt %. To get substantially pure dendrimer, the solution was vacuumed for several days at 60° C. to remove methanol. The absorbent for $CO_2$ absorption was obtained by mixing 80 parts of this dendrimer by weight with 20 parts of the ionic liquid [bmim] [DCA] (EMD Chemicals, Philadelphia, Pa.), resulting in a highly viscous absorbent.

Equilibrium Absorption Characterization:

Chau et al. (Solubilities of $CO_2$ and Helium in an Ionic Liquid Containing Poly(amidoamine) Dendrimer Gen 0, Ind. Eng. Chem. Res. 52 (2013) 10484-10494) recently reported the solubility of pure $CO_2$, pure He as well as mixtures of $CO_2$—He in the ionic liquid [bmim] [DCA] using the technique of pressure-decay dual transducer. They have also reported the solubility of these gases in ionic liquid solutions containing 20 and 30 wt % PAMAM dendrimer Gen 0 at temperatures between 50 and 100° C. and pressures up to 7 bar.

For the dendrimer-containing solutions, studies were made with and without sufficient amount of moisture so that the tertiary amine functionality of the dendrimer is also reactive when moisture is present (FIG. 1). This technique was used here to determine the equilibrium $CO_2$ solubility in a 80 wt % solution of the PAMAM dendrimer Gen 0 in the ionic liquid [bmim] [DCA] over the temperature range of 40-90° C. with and without moisture (mass transfer rate studies will indicate whether there is an optimal PAMAM concentration). Due to the high viscosity of the mixed absorbent whose density $\rho=1.18$ g/$cm^3$, equilibration time in the solubility measurement was reduced by using only 3 g absorbent liquid. Otherwise the equilibration time is long.

Figure 3:
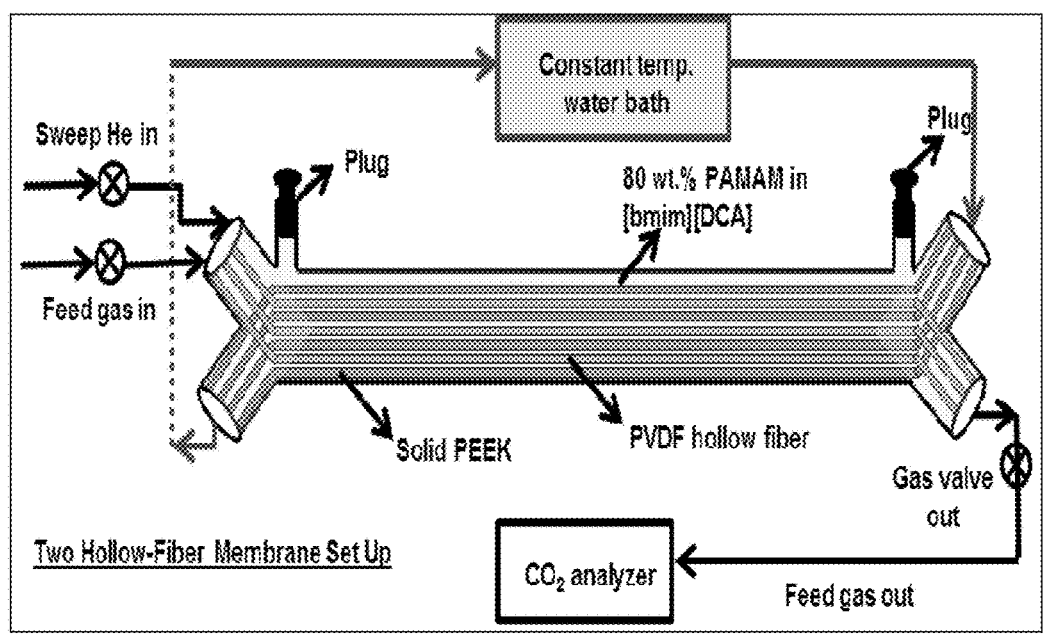
FIG. 3 shows a schematic of another exemplary temperature swing absorption-desorption set-up (membrane module shown much enlarged)

Hollow Fiber Membrane-Based Absorption-Stripping Device:

Eleven 35.5 cm long hydrophobic porous (porosity 0.54; pore size 0.2 μm) hollow fibers of polyvinylidene fluoride (PVDF) (OD/ID, 925/691 μm; Arkema, King of Prussia, Pa.) were potted with epoxy in a plastic cylindrical shell of Teflon (ID, 0.45 cm) and a Y-fitting at each end. The Y-fittings were first potted at each end of the PTFE tubing. After curing the epoxy, porous PVDF and solid PEEK hollow fibers were inserted into the device through separate arms of each Y-fitting. There were eleven solid nonporous hollow fibers of PEEK (OD/ID, 575/420 μm) of the same length commingled with the porous PVDF hollow fibers within the PTFE shell. The 75 μm thick wall of these solid PEEK hollow fibers is impervious to moisture, $CO_2$, $N_2$, $O_2$ etc. for practical purposes. FIG. 3 provides a schematic of the absorption-desorption setup using two sets of hollow fibers in one small cylindrical module.

The polymeric solid PEEK hollow fibers having a thin wall transfer heat with great efficiency, and can rapidly heat the absorbent in the inter-fiber space if one introduces hot water or low temperature steam through their lumen. These solid hollow fibers can also absorb the exothermic heat of absorption during $CO_2$ absorption if cold water is passed through their lumen for isothermal absorption. Both sets of hollow fibers had two openings at the two ends of the membrane device potted with epoxy via Y-type fittings. The shell had two additional openings; one was connected (not shown) to a liquid absorbent reservoir kept mildly pressurized to prevent gas bubbling in the absorbent from the gas passing through the bore of the porous hollow fibers. It is noted that one can use inexpensive solid polypropylene hollow fibers since as discussed later the stripping temperature employed here did not exceed 95-97° C.

To introduce the highly viscous absorbent into the shell side of the membrane module, it was diluted with water and easily introduced; then water was removed by vacuum applied through the porous hydrophobic hollow fibers. This process was repeated a few times to completely fill the shell side of the porous membrane device with this liquid. This viscous liquid absorbent present in the shell side of the novel membrane-based assembly 10 (FIG. 2) was used to implement the TSMAB process.

Experimental Procedure for Temperature Swing Absorption:

A simulated flue gas mixture containing 14.1% $CO_2$, 1.98% $O_2$, balance $N_2$ (Welco-CGI, Newark, N.J.) was introduced into one end of the porous PVDF hollow fibers for absorption of $CO_2$ (FIG. 3). Experiments were done with both dry and humidified gas. The gas was humidified by passing it through a porous hydrophobic hollow fiber membrane humidifier whose shell side was filled with water. Feed gas flow rate was controlled by a Multi-channel Mass flow Controller Model 8248A and Mass flow Controller Transducer Model MTRN-1002-SA (Matheson TRI-GAS, Montgomeryville, Pa.).

The concentration of $CO_2$ in the treated flue gas was monitored continuously by a solid-state IR-based $CO_2$ analyzer (Model 906, Quantek, Grafton, Mass.) connected to the other end of the porous hollow fiber set, the gas outlet of the module. Complete $CO_2$ capture from flue gas occurs till the onset of $CO_2$ breakthrough, followed by a slow increase in $CO_2$ concentration in the outlet gas as observed in the $CO_2$ analyzer. The feed gas may continue to pass through the fibers till the feed concentration breaks through as indicated by the feed $CO_2$ concentration (around 14.1%) appearing at the module outlet. Then the feed gas flow is stopped. The system is rapidly purged with a burst of He replacing the feed gas in the porous hollow fibers (it is noted that a different procedure may be followed; experiments were carried out with or without the burst of helium).

The two gas valves at the inlet/outlet are then closed; the bed is heated by hot water for around 10 min. Then the stripped gas is taken out facilitated by a slow flow rate of He coming into the porous hollow fibers. For a particular condition at least three cycles of absorption/thermal desorption were carried out. Before a new run was initiated, the heated bed was flushed with a sweep gas for an extended period till there was no trace of $CO_2$ in the outlet.

Results and Discussion:

The two relevant reversible reactions of $CO_2$ with the two types of amines for the $CO_2$ absorption-desorption process are:

Scheme 1: $CO_2$ Reaction with Primary Amine $$CO_2 + 2RNH_2 \rightleftharpoons RNHCOO^- + RNH_3^+ \quad \text{(Equation 1)}$$

Scheme 2: $CO_2$ Reaction with Tertiary Amine $$CO_2 + R_3N + H_2O \rightleftharpoons HCO_3^- + R_3NH^+ \quad \text{(Equation 2)}$$

The equilibrium $CO_2$ solubility in the presence of moisture is shown in FIG. 4A for various dendrimer concentrations in [bmim][DCA]. Since two primary amine groups react with one molecule of $CO_2$, four primary amine groups in the dendrimer molecule will consume two molecules of $CO_2$.

Each tertiary amine consumes one $CO_2$ molecule; two $CO_2$ molecules are consumed by two tertiary amine groups in one molecule of PAMAM Gen 0. Overall, four $CO_2$ molecules will be consumed per molecule of PAMAM dendrimer Gen 0. This amounts to 7.72 mmol of $CO_2$/g of PAMAM. For 80% PAMAM and 20% polar nonvolatile diluent, e.g., an ionic liquid, the observed $CO_2$ absorption capacity due to the dendrimer was found to be around 6.37 mmol/g of absorbent liquid. Experiments were repeated with fresh absorbents; the very minor variations in the results are shown via error bars for each composition and the associated experimental conditions.

It is noted that the measured value of the equilibrium $CO_2$ solubility is significantly larger than those of absorbents where polymeric amines of various types have been grafted, impregnated or immobilized on porous solid supports/adsorbents having beneficial characteristics. See, e.g., Samanta et al., Post-Combustion $CO_2$ Capture Using Solid Sorbents: A Review, Ind. Eng. Chem. Res. 51 (2012) 1438-1463. The absolute $CO_2$ adsorption capacity of such supported basic groups/g of the adsorbent material is considerably reduced by the porous support mass.

FIG. 4A also shows that at 90° C., the absorbent liquid's $CO_2$ absorption capacity of 0.45 mmol/g of the absorbent liquid is more than an order of magnitude lower than that at 50° C. This result suggests that stripping of $CO_2$ may be achieved without heating the absorbent to too high a temperature. This is highly useful for reducing the energy consumption. Not only the amount of absorbent and related material should be reduced but also the temperature swing range should be minimized. Further if one can avoid using steam for stripping it would be singularly useful for existing coal-fired power plants. It is noted that $CO_2$ absorption by the ionic liquid is comparatively quite low. See, e.g., Chau et al., Solubilities of $CO_2$ and Helium in an Ionic liquid containing Poly(amidoamine) Dendrimer Gen 0, Ind. Eng. Chem. Res. 52 (2013) 10484-10494.

Conventional $CO_2$ absorption processes use 20-30% amine in water. This amount of water contributes to the high energy consumption from heating and cooling. The nonvolatile absorbent, 80 wt % dendrimer-20 wt % ionic liquid, can significantly reduce the energy for regeneration. Instead of ionic liquids, in further embodiments of the present disclosure, inexpensive polar nonvolatile viscous liquids such as but not limited to, polyethylene glycol 400 can also be used. Moisture in the feed gas will keep tertiary amines active in said embodiments.

Figure 4B:
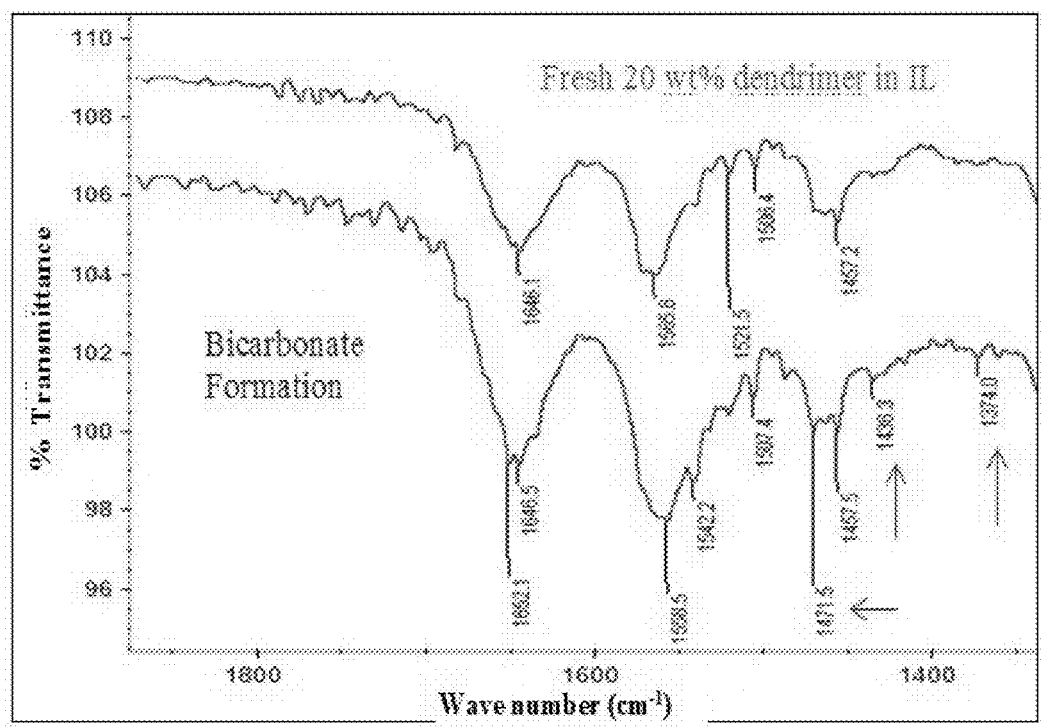
FIG. 4B shows IR spectra of fresh 20 wt % dendrimer in [bmim] [DCA] (top line) and the spectra of 20 wt % dendrimer in [bmim] [DCA] on addition of water (excess) and exposure to $CO_2$.

FIG. 4B shows the IR spectra of fresh 20 wt % dendrimer in [bmim] [DCA] and the spectra of 20 wt % dendrimer in [bmim] [DCA] on addition of water (excess) and exposure to $CO_2$. The bands at 1471.5, 1436.3, and 1374.0 cm$^{-1}$ indicate bicarbonate formation (Equation 2) due to reaction of $CO_2$ and dendrimer with addition of water.

The presence of the hollow fibers should be accounted for in such estimation of absorption capacity in so far as the membrane contactor is considered. The hollow fibers generally do not participate in gas absorption; further a certain amount of heat is spent to heat them up.

Figure 5:
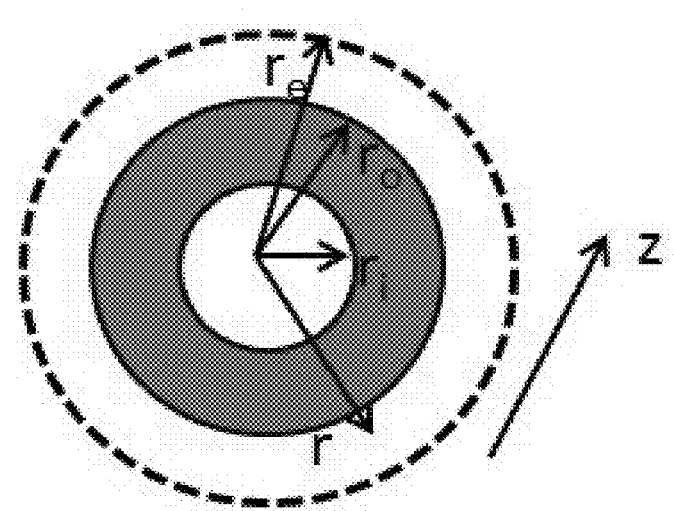
FIG. 5 shows the free surface radius around a porous hollow fiber: $r_e$—free surface radius of the liquid; $r_o$—OD of porous hollow fiber; $r_i$—ID of porous hollow fiber; hollow fiber axial coordinate is z.

To that end and as shown in FIG. 5, an analysis based on Happel's free surface model was used (J. Happel, Viscous Flow Relative to Arrays of Cylinders, AIChE J. 5(2) (1959) 174-77), which suggests assuming around the hollow fiber outside diameter (OD) an effective liquid layer whose OD is $2r_e$.

The ratio of the heat capacity of this liquid layer around the hollow fibers (of OD, $2r_o$ and internal diameter (ID), $2r_i$) to the heat capacity of this liquid layer plus the hollow fiber walls (half of the hollow fibers are porous with a wall porosity $\epsilon_f$ of say, 0.60; the other half is nonporous) is given by:

$$\rho_f C_{P,f}(r_e^2-r_o^2)/\rho_f C_{P,f}(r_e^2-r_o^2)+0.5\rho_f(1-\epsilon_f)C_{P,f}(r_o^2-r_i^2)+0.5\rho_p C_{P,p}(r_o^2-r_i^2) \quad \text{(Eq. 3)}$$

The specific heat $C_p$ of the polymers is around 0.35 kcal/kg-° C. (both $C_{P,p}$ for the solid hollow fibers and $C_{P,f}$ for the porous hollow fibers); that for the organic liquid is around 0.55 kcal/kg-° C. If one assumes $r_0$ and $r_i$ to be 287 and 213 μm, and assuming the effective liquid film thickness between neighboring fibers to be around 500 μm, $r_e$ is around 537 μm. If one assumes 1200 kg/m³ to be the density of the liquid; that for the polymer is 940 kg/m³, the ratio in (Equation 3) turns out to be 0.94, e.g., the polymers in the thin walls of the two types of fibers add 6% more heat capacity to the liquid layer. If one now removes the specific heats from the various terms in relation (Eq. 3), one will get the increase in the liquid mass due to the two sets of hollow fibers; that value is 0.91, e.g., the hollow fibers increase the total mass over that of the liquid by 9%. Therefore the equilibrium $CO_2$ absorption capacity reported earlier will be reduced by about 9% from the value of 6.17 mmol of $CO_2$/g of 80% PAMAM absorbent. This rough calculation provides a theoretical estimate of the effect of the hollow fibers.

Figure 6A:
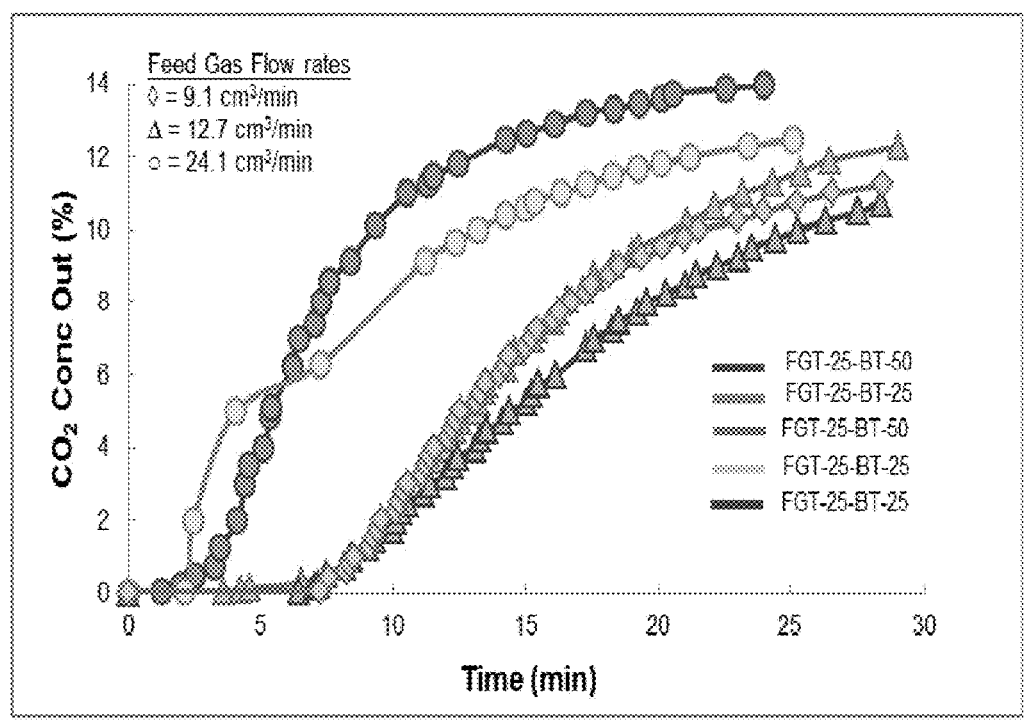
FIG. 6A shows $CO_2$ breakthrough results for dry feed gas. The symbol FGT-25-BT-25 stands for: Feed gas temperature (FGT) at 25° C. with bed temperature (BT) at 25° C.

FIG. 6A illustrates $CO_2$ absorption breakthrough behavior at 25° C. for a few dry simulated feed flue gas flow rates. The water at 50° C. was passed through the lumen of the solid hollow fibers so that the bed was maintained at 50° C.

The $CO_2$ breakthrough curves are not sharp due to the diffusional processes in the absorbent. In the module used here, the shell-side liquid amine thickness between the contiguous hollow fibers is considerable resulting in the not-so-sharp-a-rise in the outlet $CO_2$ concentration. There were very few hollow fibers in the module; the hollow fiber OD was quite large. If the porous hollow fiber surface area packing density were higher and the hollow fiber OD were considerably smaller than 925 μm, the absorbent liquid thickness in between contiguous hollow fibers would have been reduced drastically leading to a much quicker saturation and a much sharper $CO_2$ breakthrough. A high rate of $CO_2$ absorption has been already demonstrated with much lower absorbent liquid thicknesses in a highly packed porous hollow fiber device built with much smaller diameter hollow fibers (452 μm OD compared to 925 μm OD here) in a process called pressure swing membrane absorption (PS-MAB) using nonvolatile $CO_2$-reactive absorbent liquids containing a mixture of 20% PAMAM Gen 0 in the ionic liquid [bmim] [DCA]. See, e.g., Jie et al., Enhanced Pressure Swing Membrane Absorption Process for $CO_2$ Removal from Shifted Syngas with Dendrimer-Ionic Liquid Mixtures as Absorbent, Ind. Eng. Chem. Res. 53 (2014) 3305-3320; and see Jie et al., Preliminary Studies of $CO_2$ Removal from Pre-combustion Syngas through Pressure Swing Membrane Absorption Process with Ionic Liquid as Absorbent, Ind. Eng. Chem. Res. 52 (2013) 8783-8799.

As discussed above, the hollow fiber-based assembly used had too high an absorbent liquid layer thickness. As a result, the rate of utilization of the liquid's inherent absorption capacity was very slow due to diffusional limitations. The $CO_2$ absorption capacity was calculated by using the absorption breakthrough data in FIG. 6B. Results are shown in Table 1.

TABLE 1

| | | | Mmoles of $CO_2$ for wet feed gas runs shown in FIG. 4B | | | | | |
|---|---|---|---|---|---|---|---|---|
| Flue Gas Flow Rate cm³/min | Flue Gas Temp ° C. | Bed Temp ° C. | Time for Breakthrough Minute | Mmole | Mmole/g | Time sec | Moles | *Flux × 10⁴ gmol/m² · s |
| 24.1 | 25 | 50 | 40 | 1.45 | 0.677 | 2400 | 0.00145 | 2.92 |
| 12.7 | 25 | 50 | 55 | 1.73 | 0.808 | 3300 | 0.00173 | 2.53 |
| 9.1 | 25 | 50 | 103 | 1.72 | 0.803 | 6180 | 0.00172 | 1.34 |

*Based on the O.D. of the PVDF hollow fibers = 925 μm.

$CO_2$ bed breakthrough times for feed gas flow rates of 9.1, 12.7 and 24.1 cm³/min were 7.24, 6.2 and 2.4 min respectively for room temperature bed and 25° C. feed gas temperature. For the bed at 50° C., the breakthrough time for a gas flow rate of 12.7 cm³/min was around 3.5 min. Bed temperature change did not significantly affect the breakthrough time for a feed flow rate of 24.1 cm³/min. The outlet $CO_2$ concentration of FGT-25-BT-25 becomes lower than that of FGT-25-BT-50 at about 7 min and stays lower with time since the extent of $CO_2$ absorption is higher at a lower temperature.

Figure 6B:
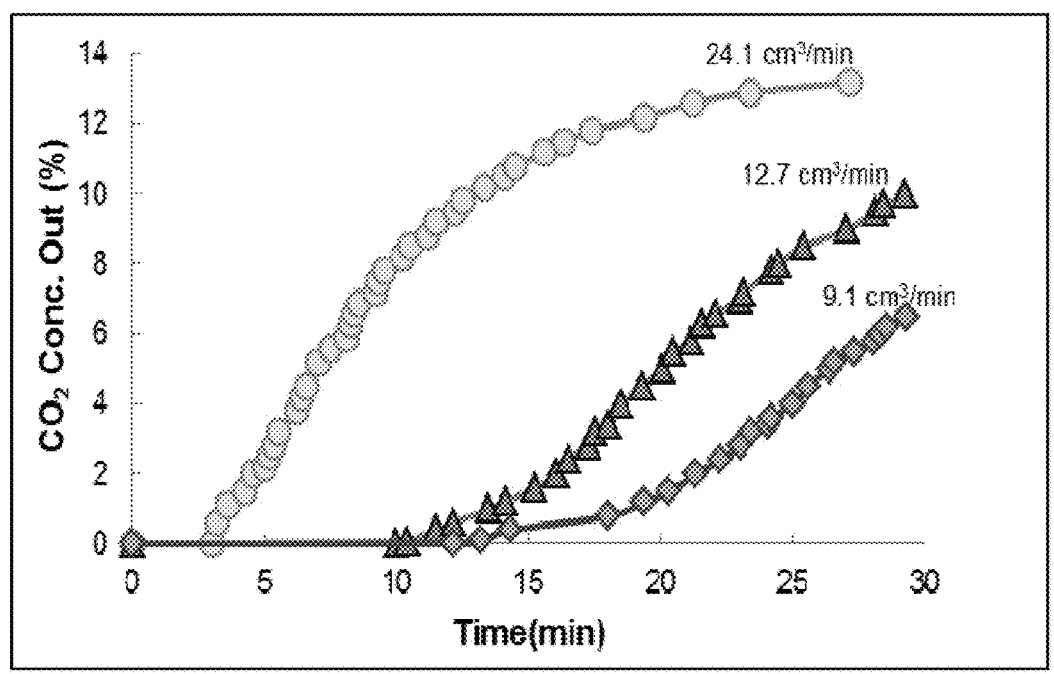
FIG. 6B shows $CO_2$ breakthrough results for three wet feed gas flow rates: feed gas temperature, 25° C.; bed temperature, 50° C.

FIG. 6B illustrates the breakthrough for humidified flue gas. For 50° C. bed temperature, the breakthrough times for feed gas flow rates of 9, 12.7, and 24.1 cm³/min, were 12.13, 10.01 and 4 min respectively. Moisture in the feed gas almost doubles the amount of $CO_2$ absorbed since the tertiary amine groups in PAMAM dendrimer become reactive in the presence of moisture. During absorption at 50° C., In the short test module, there were considerable end effects. The gap between the contiguous hollow fibers increased by few orders of magnitude near the two module ends where the two hollow fiber sets were separated and taken out through separate inlets/outlets. Such effects will be reduced drastically in longer membrane contacting modules. In experiments reported here, the module configuration used prevented most of the absorbent being utilized.

To initiate temperature swing $CO_2$ desorption via absorbent regeneration, hot water was passed for 10 min through the PEEK solid hollow fibers. Due to the high water flow rate (380 cm³/min) used, the bed temperature rose quickly. The module-end thermocouples ensured that the bed temperature was maintained at the desired level. After 10 min, the inlet and the outlet valves connected to the porous PVDF hollow fibers were quickly opened; a He sweep stream was passed through the porous hollow fiber bore at around 5 to 12.5 cm³/min.

Absorbent regeneration was studied at bed temperatures of 85, 90, 95 and 97° C. by measuring the $CO_2$ concentration in the sweep He stream. Table 2 below summarizes the results for dry and wet simulated flue gas for various sweep He flow rates. As the He sweep flow rate is reduced, the sweep He stream $CO_2$ concentration increases. However, too low a He flow rate reduces the extent of stripping. The results show the quality of the stripped $CO_2$ stream. The highest $CO_2$ concentration in the He sweep was around 45% $CO_2$.

The variations in the observed measurements of rates of absorption into and desorption from the module under a given set of flow and thermal conditions and carried out consecutively were in the range of ±4-5%. Determination of any decrease in the capacity or rate of absorption due to absorbent degradation will require more runs since a considerable amount of shell-side absorbent could not be utilized.

A few changes can considerably increase the $CO_2$ concentration in the stripped gas stream and the $CO_2$ partial pressure. The stripped $CO_2$ partial pressure can be increased by using substantially pure dendrimer as absorbent. Therefore in further embodiments of the present disclosure, pure dendrimer is used as an absorbent. In further embodiments, the pure dendrimer is introduced just as the 80-20 mixture was introduced by diluting it with water and evaporating it. For a given amount of desorbed $CO_2$, the gas space volume in the bore of the porous absorption hollow fibers can be reduced. Here, the porous gas absorption hollow fibers have 691 µm ID; this may be reduced to around 100-650 µm, substantially increasing the stripped $CO_2$ partial pressure. Two times hollow fiber ID reduction means four times fiber bore volume reduction. Calculations indicate that $CO_2$ solubilities of 2 mmol/gm of absorbent will if stripped completely will provide quite a reasonable pressure of $CO_2$ in the fiber bore of diameter 240 µm. It is important is to have a high amount of absorption of $CO_2$ in the absorbent. Further its $CO_2$—$N_2$ selectivity will be very high.

The hollow fiber diameter reduction has other benefits. Reduced hollow fiber OD will lead to higher surface area for gas absorption in a given device volume, reduced thickness of the absorbent liquid in between contiguous hollow fibers and better absorbent utilization. The absorption breakthrough will be sharper. Such a process will be facilitated by increasing the packing density of the two types of hollow fibers. The absorbent has a high $CO_2/N_2$ selectivity: one expects the purity of this desorbed $CO_2$ stream to be high.

Microporous hydrophobic membranes do have a tendency of pore wetting. None was observed in these studies. There are at least three ways the membrane pores can get wetted with a nonvolatile absorbent: (1) Surface tension of the absorbent solution is lower than the critical surface tension of the hollow fiber polymer. Here the surface tension of the 80% dendrimer-20% ionic liquid absorbent is much larger than the critical surface tension of the PVDF polymer namely, 24 dyne/cm; therefore there is not really a chance as such of membrane pore wetting. (2) The shell-side liquid pressure is raised beyond the pore liquid entry pressure. Here the shell side pressure is slightly above atmospheric; so this possibility does not arise. (3) The absorbent chemicals especially the ionic liquid may modify the surface of the hollow fiber and make it more hydrophilic. This effect is generally unknown for the particular system. If there is membrane pore wetting, it will reduce the gas flow area on the bore side of the hollow fiber and increase the diffusional path length in the locations of leakage.

TABLE 2

Variations of Temperature and Sweep He Flow Rate and its Effect on $CO_2$ Stripping*

| Feed Flue Gas | Bed Temp Absorption/ Desorption (° C.) | Sweep He Incoming Flow Rate ($cm^3$/min) $Q_{in}$ | $CO_2$ Concentration (%) in Sweep Helium Stream $C_{out}$ | Sweep He Outgoing Flow Rate ($cm^3$/min) $Q_o$ | Stripper Production Rate ($cm^3$/min) |
|---|---|---|---|---|---|
| Dry | 25/85.1-84.2 | 12.1 | 19.2 | 15.8 | 3.03 |
| Dry | 25/90.2-89.8 | 12.1 | 22.3 | 15.8 | 3.52 |
| Dry | 25/95-94 | 12.1 | 27.1 | 15.8 | 4.28 |
| Dry | 25/97 | 12.1 | 28 | 15.8 | 4.42 |
| Dry | 25/97 | 7.18 | 40 | 11.15 | 4.46 |
| Wet | 50/97 | 7.18 | 44.8 | 11.15 | 4.99 |
| Wet | 50/97 | 4.78 | 31 | 6.66 | 2.06 |
| Wet | 60/97 | 7.18 | 28 | 10.27 | 2.87 |

*For 12.7 $cm^3$/min of simulated feed flue gas flow rate (dry and wet (RH = 91%)).

Remarks:

A novel membrane contactor has been developed for $CO_2$ absorption and stripping via a process identified as temperature swing membrane absorption (TSMAB). This contactor integrates non-dispersive gas absorption and hot water-based $CO_2$ stripping in one device/assembly containing two sets of commingled hollow fibers.

One set of hollow fibers are porous and hydrophobic allowing non-dispersive gas absorption or stripping. The other set of hollow fibers are solid, nonporous and impervious to moisture and inert gases; hot water is used in the bore of these fibers for heating the absorbent for stripping the absorbed $CO_2$.

In between the two sets of hollow fibers, the shell side is filled with a nonvolatile stagnant absorbent consisting of 80% PAMAM dendrimer Gen 0 and 20% ionic liquid. This absorbent has a high $CO_2$ absorption capacity as measured in an equilibrium absorption cell.

In a cyclic TSMAB process, $CO_2$ was absorbed from simulated flue gas flowing through the bores of the porous hollow fibers till it broke through. Heating of the absorbent bed with hot water at 85-97° C. passed through the bores of the solid hollow fibers stripped the absorbed $CO_2$ into a small sweep helium stream. The working $CO_2$ sorption capacity of the absorbent in this device was low, 0.803 mmol/gm absorbent. This may be substantially increased by reducing the outside diameter of the hollow fibers, and increasing the hollow fiber packing density. The composition of the stripped $CO_2$ stream can be increased to a very high $CO_2$ level if the porous hollow fiber ID can be substantially reduced.

Further Analysis:

Some deficiencies of this system and/or experimental setup are as follows. (1) The amount of $CO_2$ absorbed was not high due to a number of reasons; therefore the working capacity of this module was low. The gas-liquid contact area provided was limited. The liquid layer thickness on the shell side between few large diameter hollow fibers in the module was very high resulting in a diffuse breakthrough. Some of the absorbent liquid was not utilized. The breakthrough being observed was due to the liquid layers immediately surrounding the fibers. The absorbent liquid used had a very high viscosity (see values provided later) which may have contributed to this behavior. (2) The bore-side volume of the porous PVDF hollow fiber membranes was high given its ID to be around 700 µm. When the small amount of $CO_2$ absorbed was desorbed by heating, it was not enough to generate a stream of its own in the large hollow fiber bore; it had to be swept out by a small helium stream as shown in Table 2. There generally was no $N_2$ in the desorbed stream due to the highly $CO_2$-selective absorbent; the $N_2$ left from the flue gas absorption step in the bore of the porous PVDF hollow fibers was removed earlier before closing the module ends for heating by a very brief burst of the helium stream supplied. (3) The time period for heating the bed can be substantially reduced by having more numerous solid hollow fibers with a smaller OD and a much thinner liquid layer in between the hollow fibers on the shell side. (4) Similarly the time period for absorption breakthrough can be reduced considerably by having thinner liquid layers in between the hollow fibers. (5) The module used was short only 35.5 cm long. The end-effects were considerable since near the module ends the fiber sets should be separated resulting in deviation from the basic configuration with absorbent fibers and heating fibers being next to each other. A desirable module can have considerable length to reduce the end effects. (6) The absorbent liquid of 80% PAMAM Gen0 in ionic liquid used had a very high viscosity which may have contributed also to the observed diffuse breakthrough. It would be useful to employ high-boiling lower molecular weight amines on the shell side. At the cost of a very small loss by volatilization during the $CO_2$-stripping period, low molecular weight amines will provide much lower viscosity and therefore much higher $CO_2$ transfer rate and a much higher working capacity.

Solid Hollow Fibers for Heat Exchange:

As shown in FIG. 2, there will be a second set of hydrophobic hollow fibers in the module. In some embodiments, these are nonporous hollow fibers of polypropylene (PP) (I.D. 250-300 µm; solid wall of thickness around 50-75 µm). Cold water will flow through the bore of these solid wall hollow fibers during gas absorption part of the cycle to remove the exothermic heat of absorption. Water vapor permeation through such a thick solid hydrophobic semi-crystalline polymer wall is zero. During bed regeneration, hot water will be brought into the bores of such fibers to heat up the $CO_2$-loaded amine absorbent on the shell side and achieve successful stripping of the gases into the bores of the first set of porous hollow fibers. The present disclosure has studied the highly encouraging heat exchanger performances of such solid hollow fibers of PP with hot saline water and steam at low temperatures. The thermal inertia of such fibers is limited. Rapid response was observed. There was no observed water vapor or $N_2$ permeation. These hollow fibers can achieve reasonable heat transfer coefficients approaching 2600 W/(m²-K). Their volumetric thermal conductances are an order of magnitude higher than those for conventional shell-and-tube metallic heat exchangers because of the much higher surface packing density in hollow fiber modules. The present disclosure has also studied solid hollow fibers of PEEK, polytetrafluorethylene, polyethersulfone etc. In such exploratory TSMAB experiments, PEEK hollow fibers were used since it was unsure of what temperature will lead to efficient $CO_2$ stripping.

Desirable Device Configuration, Hollow Fibers and Absorbents for TSMAB:

The following combinations of hollow fibers, device configuration and absorbents are likely to yield an efficient and compact device having a high working $CO_2$ absorption capacity and requiring minimum energy input while delivering 90% $CO_2$ recovery with a $CO_2$-rich stream containing 95% $CO_2$. Consider first the hollow fibers and the device configuration. The hollow fiber device should have a high fiber packing density around 40%; further the porous hydrophobic hollow fibers should have OD/ID around 290/240 µm; the solid hollow fibers should have similar dimensions (their wall is thicker around 50-75 µm). These characteristics would lead to the following important features:

(1) Since the hollow fiber OD is considerably reduced, the effective liquid absorbent thickness in between two highly packed sets of hollow fibers will not be more than 400 to 450 µm. The gas phase volume in the fiber bore will also be considerably reduced due to porous hollow fiber ID reduction producing a much purer stripped $CO_2$ stream with a much higher partial pressure (two times ID reduction means four times volume reduction). Calculations indicate that $CO_2$ solubilities of 2-7 mmol/gm of absorbent will if stripped completely will provide quite a reasonable pressure of $CO_2$ in the fiber bore of diameter 240 µm. One key is to have a high amount of absorption of $CO_2$ in the absorbent; a pure or an almost pure low MW amine does it. Further its $CO_2$—$N_2$ selectivity will be very high.

(2) The hydrophobic hollow fibers should not be wetted by the amine absorbent used on the shell side. It is preferable to use porous polypropylene hollow fibers having the stated dimensions with a highly porous superhydrophobic fluorosiloxane coating on the fiber OD. Such hollow fibers are quite inexpensive and have been already used successfully by the present disclosure in membrane contactor studies without any wetting. Solid hollow fibers of PEEK have been used in exploratory attempts since it was unsure about stripping $CO_2$ at lower temperatures. One can now use inexpensive solid hollow fibers of PP or Nylon which are chemically resistant to the amines being used.

Regarding the absorbent, it is important to substantially enhance the mass transfer rate into the absorbent at 40-50° C. compared to what we achieved in our exploratory experiments using 80% PAMAM in an IL. While the changes suggested regarding the hollow fibers and the device configuration will enhance radically the mass transfer rate into the absorbent, absorbents having a much lower viscosity will be very helpful. Consider MDEA and DEA. The following properties of these two absorbents are of intrinsic interest to reduce their loss: Boiling point—247.1° C., 271° C.; vapor pressure (at 20° C.)—1 Pa, <1 Pa.

These properties will lead to limited loss if the cyclic operating temperature range is limited to 40-95° C. Further the dynamic viscosities of such pure amines (e.g., MDEA) at 20° C. are around 100 mPa·s (1 Poise). It is orders of magnitude lower than that of PAMAM dendrimer Gen 0. For example, viscosity of PAMAM dendrimer Gen 0 at 40° C. is 567 Poise (at 50° C., 178 Poise).

There is another aspect of interest here. Absorbents like MDEA which is a tertiary amine need moisture for reaction with $CO_2$; DEA generally does not need any water. While moisture is provided by the moist flue gas, that may or may not be enough; the absorbent should have some moisture if one wants to utilize the intrinsic capacity of the absorbent. However the water content of the shell-side absorbent should not be high; its vaporization during the stripping stage will consume energy. A mixed absorbent of MDEA/DEA will require less water. It is to be noted that the theoretical $CO_2$ absorption capacity of MDEA is very high, 8.39 mmol/g of MDEA if we assume that equation (2) is valid: one mole of MDEA consumes one mole of $CO_2$.

Some absorbent properties interact with the hollow fiber membrane surface in so far as operation with nonwetted membrane pore is needed. When PAMAM dendrimer Gen 0 was used pure or diluted with PEG 400/a suitable IL, no pore wetting was observed. The surface tensions (PAMAM, 47 mN/m; PEG 400, 45 mN/m; IL (e.g. [bmim][DCA]) around 42 mN/m), are significantly above the hollow fiber polymer's critical surface tension, $\sigma_{cr}$, (PP, 33 mN/m; PVDF, 24 mN/m) over the required temperature range.

In the case of pure MDEA, the surface tension is in the range of 36-39 mN/m for our proposed temperature range; a little (5-10%) diluent (including water) will increase it considerably. The hydrophobicity of the porous PP hollow fiber outside surface can be substantially enhanced by having a highly porous plasma polymerized fluorosiloxane coating whose a, is 16-18 mN/m; this superhydrophobic surface will also eliminate any sorption-based hydrophilization from any vaporized low MW amine. Further such hollow fiber modules cost orders of magnitude less than the very expensive PEEK hollow fibers employed in a recent DOE-funded membrane contactor study for post-combustion $CO_2$ removal.

Mass Transfer in $CO_2$ Absorption in the TSMAB Process and Device:

During flue gas scrubbing, $CO_2$ undergoes transient absorption in the stagnant shell-side absorbent. In stagnant gas absorption for contact time t, the physical absorption rate is proportional to $\sqrt{(D_{CO_2}/\pi t)}$ leading to high gas absorption rates for short contact times. The mass of gas absorbed/area is proportional to $(\sqrt{(D_{CO_2}/\pi}}$. One key parameter is $D_{CO_2}$, $CO_2$ diffusivity in the absorbent, which varies as (1/liquid viscosity). The viscosity of PAMAM dendrimer Gen 0 is very high; at 50° C. the dynamic viscosity of 20 wt % solution in [bmim][DCA] is 40 mPa·s (40 cp); its 80 wt % solution in [bmim][DCA] had very high viscosity drastically reducing the rate of $CO_2$ absorption. Recent project studies on pressure swing absorption/desorption of $CO_2$ from high pressure shifted syngas in an IL containing 20 wt % dendrimer Gen 0 indicate rapid rates of $CO_2$ absorption/stripping (near equilibrium level in 60 s). However compared with our exploratory flue-gas studies, the shell-side liquid thickness was a few times lower, the syngas $CO_2$ partial pressure was much higher and the temperature was between 50-100° C. By proposing pure (or 90-95% pure) low MW amines e.g., MDEA and DEA, one reduces absorbent viscosity by orders of magnitude. Since liquid viscosity varies exponentially with (1/absolute temperature, T), the 20° C. dynamic viscosity of pure MDEA, around 100 mPa·s (1 Poise, 100 cp), will be considerably reduced at 40-50° C. during the flue gas absorption. It needs reemphasis: dynamic viscosities of pure PAMAM dendrimer Gen 0 are: 40° C., 567 Poise (56700 mPa·s); 50° C., 178 Poise (17800 mPa·s).

Traditionally the low MW liquid amines are used in an aqueous solution at the level of around 30-40%. One membrane contactor study using PEEK hollow fibers employed 40 wt % solution of MDEA and MDEA with piperazine (aMDEA). When one uses 90%+MDEA (proposed level), one can enhance the rate of these fast reactions for reactive absorption by at least a few times. Therefore one can expect very rapid rates of $CO_2$ absorption at 40-50° C. with almost pure MDEA or DEA as absorbent. Desorption will occur at 80-95° C.; one can expect orders of magnitude lower viscosity and fast desorption.

Comparison with a Separate Absorber and a Separate Stripper:

In conventional membrane contacting processes, one uses a single hollow fiber set-based membrane contactor for absorption. For stripping sometimes membranes are used; often a packed tower is used. There are reasons why the proposed integrated device/process concept is much superior even if one uses almost pure amine liquid as the flowing liquid in a conventional membrane contactor.

The absorbent inventory in the novel membrane contacting module-based system is much lower since the $CO_2$-loading of the shell-side absorbent is pushed to the limit. This is achieved by continuously passing the flue gas at a reasonable flow rate without much gas phase pressure drop over an extended period of time till $CO_2$ breakthrough. Further since the liquid film thickness is very much reduced in the novel device, one may not need an extended time for saturation. When the absorbent is flowing in a conventional hollow fiber module with a reasonable gas phase flow rate thus avoiding much gas phase pressure drop, the absorbent capacity is not effectively utilized. It should be made to flow through a few more hollow fiber modules in series with fresh gas coming into each module to achieve a better utilization of its inherent absorption capacity. This will lead to considerable absorbent phase pressure drop unless the hollow fiber module is quite open in which case the liquid inventory is increased considerably; therefore a much larger absorbent mass and device mass should be cooled and heated. The thermal energy input is increased considerably, the device footprint is higher and capital cost increases. Further liquid phase flow pressure drop and energy consumption is also significant for a much larger absorbent inventory with a mobile absorbent phase. On the other hand, in the novel design, the mass transfer rates are likely to be quite reasonable since the absorbent viscosity is not very high at 40-50° C.

Flue Gas Contaminants:

Flue gas has various contaminants, $O_2$, $SO_2$, $NO_2$, trace elements, fly ash etc. Preliminary tests involving 40% aqueous solution of aMDEA solvent (MDEA promoted by piperazine) indicated that the $CO_2$ capture performance was not affected by flue gas contaminants, including $O_2$, $NO_2$, and $O_2$, with aMDEA solvent. It may be necessary to carry out studies with a few of these contaminants especially $SO_2$, $NO_2$ since $O_2$ will be present in the flue gas to be used.

Energy Costs:

The inventory of the absorbent liquid in the proposed new technique is going to be significantly less than that in a conventional contacting process. If one can utilize a very large fraction of the inherent reactive absorption capacity of this liquid, one will require much less thermal energy to heat and cool the lower liquid volume. The hollow fiber support mass will increase the thermal energy needed only to the tune of 10-15%. Since the temperature swing range will be 50° C. to 90-95° C., thermal load will be considerably reduced; hot water can be used. If one can utilize the inherently high $CO_2$ absorption capacity of the almost pure amine absorbent, one can reduce the temperature range to 50-85° C. By allowing cold water to pick up the heat of absorption during exothermic absorption, heat needed to provide hot water for $CO_2$ stripping will be reduced. Pumps and pumping costs are eliminated for the absorbent. By drastically increasing the amount of $CO_2$ absorbed and reducing the volume of the bore of the porous hollow fibers which will collect the stripped $CO_2$, we will generate enough pressure for an almost pure $CO_2$ stream to flow out.

Example 2

There are a number of technical goals for further embodiments. For example, one can further develop a number of novel cylindrical membrane contactor modules containing a tightly packed and commingled sets of two different types of hollow fibers.

One can then fabricate an experimental setup for scrubbing of simulated flue gas in the cylindrical hollow fiber membrane contactor module developed above and purified $CO_2$ recovery from it by the temperature-swing membrane absorption-stripping process. One can also determine the TSMAB performance of the novel membrane contactor device and system containing selected low molecular weight amine absorbents with 5-10% diluent/promoter in the shell side of the hollow fiber module for $CO_2$ scrubbing from simulated flue gas and purified $CO_2$ recovery. One can determine the equilibrium gas absorption capacity of the selected amine solvents, and determine the kinetics of reactive $CO_2$ absorption in a selected amine liquid, and also develop a model and conduct numerical simulations to describe the observed flue gas purification performance.

Experimental Approach—Novel Two-Fiber Set Membrane Contactor Modules:

In exemplary embodiments, novel two-fiber set based membrane contactor modules (e.g., FIG. 2) that are around 0.6-0.9 m long can be fabricated. The ID of the plastic shell (of Nylon, PP etc.) of such a module can be around 1.27 cm (0.0127 m).

The porous hydrophobic PP hollow fibers having dimensions of 240 μm ID and 290 μm OD and a wall porosity of around 0.45 (supplied by Membrana, Charlotte, N.C.) can have a highly porous plasma polymerized fluorosiloxane coating applied on the OD. It is noted that the porous hydrophobic PP hollow fibers can have a wall porosity of from about 0.20 to about 0.80. The second set of solid PP hollow fibers can be solid PP hollow fibers that are straightforward extrusion items. Fabrication of TSMAB modules using two hollow fiber sets (FIG. 2) will follow established techniques using two porous hollow fiber sets as well as mixed hollow fiber sets having one porous and one solid hollow fiber.

In certain embodiments, the total porous membrane surface area for absorption-stripping will be around 0.23 m² for 0.9 m long modules at the higher end of fiber packing density; the solid hollow fibers can have an equivalent amount of surface area for heating and cooling. The hollow fibers can have two separate epoxy-potted ends at each end of the module in a Y-connection for the two sets of fibers. The shell-side of the module can have two sets of connections on the shell side, one for absorbent liquid introduction from the liquid reservoir and one for liquid bleeding if needed.

Figure 8:
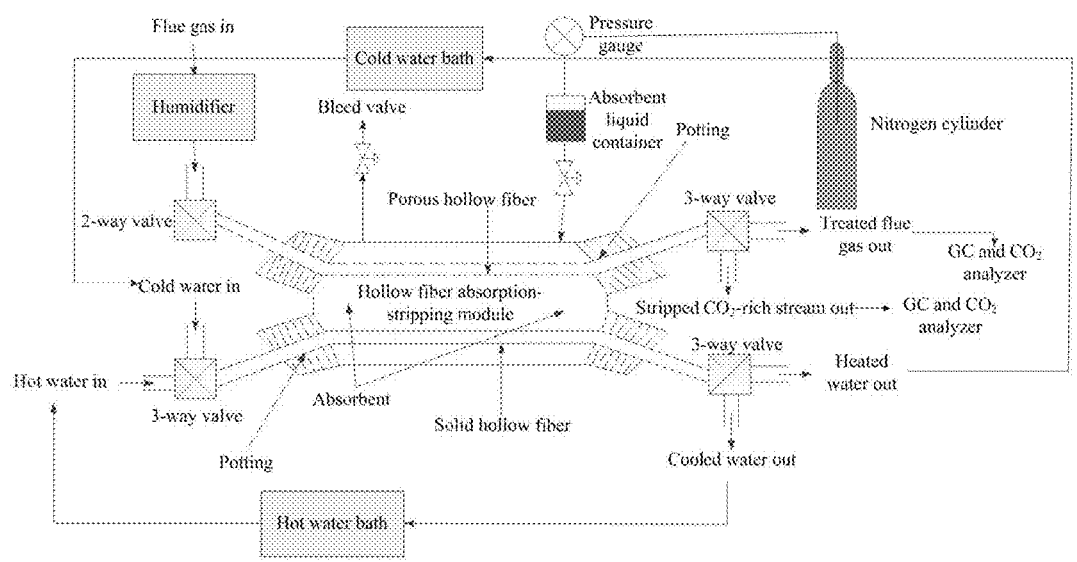
FIG. 8 shows a schematic of an experimental set up around a two hollow fiber set-based module with absorbent on the shell side (module shown is not to scale; certain embodiments will have around 1.3 cm diameter and 0.9 m length). Further only one of each kind of fiber is shown. In a module, there will be hundreds of hollow fibers very well packed as in FIG. 2.

Experimental Approach—Experimental Set Up and Absorbents:

FIG. 8 provides a schematic diagram of a proposed experimental set up for studying the TSMAB process. In FIG. 8, the schematic of the two hollow fiber set-based module is shown much larger than scale. Further only one hollow fiber of each kind is shown in the cross-sectional view; FIG. 2 shows that there will be quite a few fibers of each kind in such a module. The proposed setup for the TSMAB process will have the following important components: (1) two hollow fiber sets-based TSMAB device; (2) feed flue gas and utilities, e.g., hot/cold water; (3) analysis of gas stream compositions; (4) data gathering; (5) solenoid valves, timers and PLC (programmable logic controller) control arrangements.

FIG. 8 illustrates the core experimental setup with various utility connections; an absorbent source is connected as suggested in FIG. 2. For heating/cooling, one can use in the module 250-300 solid nonporous hollow fibers (e.g., 250-300 μm (ID) and 50-75 μm wall thickness) of PP or Nylon (Applied Membrane Technology ("AMT"), Minnetonka, Minn.).

For gas absorption, one can use in the same cylindrical module 250-300 porous PP hollow fibers of dimensions 240-290 μm (ID-OD) (Membrana, Charlotte, N.C.) having a porous plasma polymerized fluorosiloxane coating on the OD (AMT, Minnetonka, Minn.). The fluorosiloxane coating will prevent possible PP membrane pore wetting by the amine liquids on the shell side.

The module-end potting of the two sets of densely packed commingled fibers in a plastic shell can use epoxies suitable for the temperature range. The modules can be at least 0.5 m, preferably longer. One can prepare such modules with fibers procured from AMT Inc. and Polymer Processors for the solid hollow fibers. Each module in use can be insulated to reduce heat losses to the surrounding.

Dry flue gas having a composition of 14% $CO_2$, 2% $O_2$ and balance $N_2$ can be supplied from gas cylinders. This gas can be humidified in a humidifier before introducing into the novel membrane contactor module. The humidity can be monitored using a Humidity Probe Model HMP76 and a digital readout display unit, Model M170 (Vaisala, Woburn, Mass.). Lower gas flow rates will rapidly reduce $CO_2$ concentration with little pressure drop through the bore of the fibers. One can reduce the dead volumes of connections. The compositions of the $CO_2$-depleted flue gas stream and the stripped highly $CO_2$-rich stream can be continuously monitored with a $CO_2$ analyzer with a solid-state based infrared sensor (Model 906, Quantek Instruments, Grafton, Mass.); the compositions can also be analyzed by a GC/TCD (Shimadzu GC 2014) at appropriate times. Each gas stream line can have an independent Quantek $CO_2$ analyzer and a GC. The Quantek analyzer can provide in real time the important information about $CO_2$ levels in both the treated flue gas and the stripped $CO_2$-rich gas.

Temperatures of the flowing gas streams, the stagnant absorbent liquid and the flowing cold/hot waters in the solid hollow fiber circuit can be measured and recorded in a computer continuously via data loggers (Omega Eng., Stamford, Conn.). Pressure transducers with digital readouts (Omegadyne, Sunbury, Ohio) can measure gas stream and the water line pressures. Tests using flue gas contaminants $SO_2$ (around 140 ppmv) and $NO_2$ (around 60 ppmv) can also be carried out near the end of the project.

Per FIG. 8, one can procure three 3-way solenoid valves and one 2-way solenoid valve and the required timer relays (Ives Equipment, King of Prussia, Pa.). After one has studied the behavior of individual steps in a four step absorption-heating-stripping-cooling cycle, a PLC control system currently available can be modified (PneuMagnetic, Quakertown, Pa.) to automatically control these valves in a predetermined pattern which can be varied to understand the system behavior. One can use a separate 'Hot water bath' and a 'Cold water bath' to develop experimental control of the stripping-by-heating step and the maintaining an isothermal absorption step respectively.

Some exemplary absorbents of interest are pure MDEA, aMDEA and DEA. The absorbents can be used with a small amount of water. In the case of MDEA, which is a tertiary amine, the amount of water needed will be much higher (since tertiary amines work in the presence of water; see reaction (2)) compared to DEA. In the case of aMDEA, 2-5% piperazine can be added to promote the reaction in the presence of considerable water; dilute 20 wt % aqueous solution of $K_2CO_3$ will not be used since during heating energy loss takes place from the evaporation of water. A mixture of MDEA and DEA can be explored to reduce the level of water needed and reduce the consumption of energy due to substantial water evaporation.

Experimental Approach—Study TSMAB Performance with Simulated Flue Gas:

At the beginning, one can study independently the four steps in a cyclic TSMAB process using a single hollow fiber module. After one has developed a good guidance for the duration of each step, then repeated cyclic operation can be carried out using a PLC (programmable logic controller) control panel and appropriate valve sequence programming (PneuMagnetic, Quakertown, Pa.) with one module.

STEP 1: $CO_2$ Absorption from Simulated Flue Gas.

Some basic questions some can ask in this step are: How long does it take for $CO_2$ to break through the exit end of the porous hollow fiber for different feed flue gas flow rates at 50° C. incoming gas temperature? How does the shape of the breakthrough look like? What is the amount of $CO_2$ absorbed? What is the working $CO_2$ sorption capacity per g of the absorbent on the shell side? Does the breakthrough time change when a number of cycles are implemented? When this step is stopped to initiate the next step can be decided based on a number of considerations including the nature of the stripped $CO_2$ product and the overall $CO_2$ recovery desired. During this step cold water can be passed through the bore of the solid hollow fibers to absorb the exothermic heat of absorption.

STEP 2: Heating the Absorbent Bed to the Stripping Temperature.

After completion of $CO_2$ absorption from flue gas with say, 90%+ absorption from the flue gas supplied, the flue gas inflow can be shut down and the openings in the porous hollow fibers at both ends can be closed. The bed can be heated up by passing hot water through the bore of the solid hollow fibers to prepare for stripping-based recovery of absorbed $CO_2$ from the shell-side amine absorbent. The temperature of the bed can be monitored with thermocouples appropriately embedded.

STEP 3: Exit of the Stripped $CO_2$-Rich Stream.

After the bed has reached the desired temperature between 80-95° C. as determined by thermocouples, one of the ends of the porous hollow fiber set can be opened and the accumulated gas in the hollow fiber bore resulting from stripping of the absorbent can be allowed to flow out. The duration of the time even after the bed has reached 80-95° C. should be investigated to determine the extent of recovery via stripping. The duration of the outflow of the stripped $CO_2$-rich stream should be studied also. Note that there can be a short pulse of $N_2$-rich gas at the very beginning.

STEP 4: Cooling the Bed Down to the Absorption Temperature.

Figure 9A:
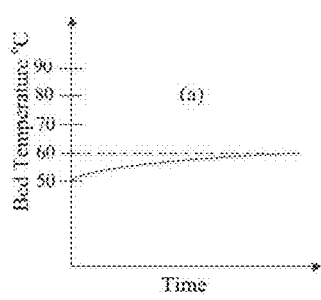
FIGS. 9A-C show temperature vs. time profile in the absorbent bed during the following steps.
Figure 9B:
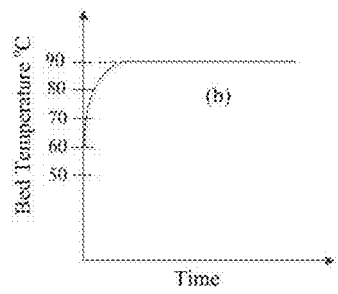
Figure 9C:
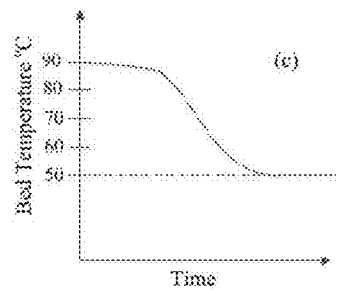

After one has exhausted the exit of $CO_2$ generated by stripping, one may need to shut the two ends of the porous hollow fibers and bring cold water at 50° C. through the bore of the solid hollow fibers to cool the bed down. Once the bed temperature has come down to 50° C., the two ends of the porous hollow fibers should be opened for inflow of the simulated humidified flue gas. The time-temperature variations in the absorbent bed with time are illustrated in FIGS. 9A to 9C.

Figure 10:
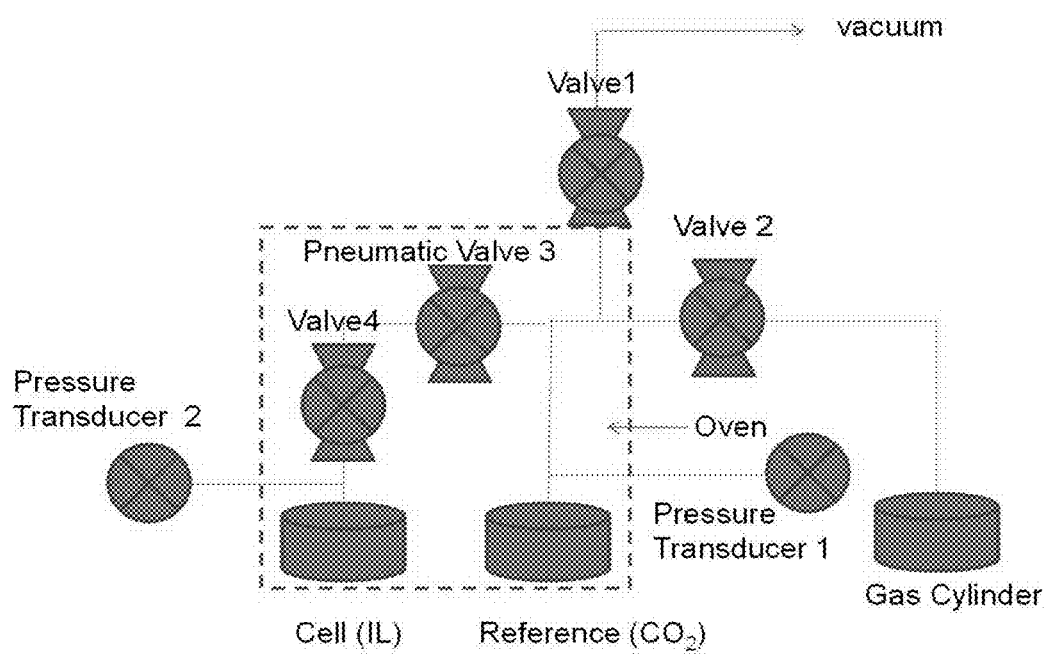
FIG. 10 shows an exemplary apparatus for measuring gas solubility; the test cell is identified as Cell (IL).

Equilibrium $CO_2$ Absorption Capacity of Selected Amine Solvents:

A pressure-decay-dual transducer apparatus used to obtain $CO_2$ and He solubility in an IL and dilute dendrimer solutions in IL (described in detail in Chau et al., 2013, above) can be employed to measure solubility of $CO_2$, $N_2$ and $O_2$ in low MW amines over 40-95° C. and around 1 atm. FIG. 10 shows an exemplary schematic for the system. The system contains a cell volume identified as Cell (IL), a reference volume, a programmable temperature oven (Model PH-202, ESPEC N. America, Hudsonville, Mich.), and a gas cylinder. A measured volume of close to 10 mL of liquid absorbent (measured and weighed) is added to the cell. A predetermined amount of water is also weighed and added to the absorbent to make up to 10 mL in a graduated cylinder. The solution is then transferred into the Cell (IL) (stainless steel cylinder). Since the amines do have some volatility, one can adopt the method implemented by Chau et al. when moisture was present. After the connection to the cell cylinder is closed with an open/closed valve 4, the system is degassed for 3 h without the cell cylinder to prevent water and amine being evacuated during the degassing. Then the cell cylinder is attached onto the system and is degassed for 15 min. Otherwise degassing for an extended time can lead to significant loss of amine as well as moisture.

The desired gas ($CO_2$ or $N_2$ or $O_2$ or a mixture) is then loaded into the reference s. steel cell cylinder with valves 1 and 3 closed to a pre-determined pressure as valve 2 is opened. The oven is turned on to allow the gas to reach a desired temperature in the reference cell. Then valve 2 is closed and valve 3 is opened (valve 4 is opened as well) by a pneumatic controlling unit (PneuMagnetic, Quakertown, Pa.) which allows a user to open/close valve 3 with a toggle switch easily accessible outside the oven. Valve 3 can be opened for up to 99 h long enough to ensure establishment of equilibrium between both cylinders. The final pressure difference is used to calculate the moles of gas absorbed. Changes in pressure versus time are recorded by pressure transducer units in both cell and reference cylinders. The transducer pressure range is: 0-1.72 MPa, 0.25% linearity accuracy; it can withstand up to 115° C. For $CO_2/N_2/O_2$ mixtures, the equilibrium composition can be determined by a gas chromatograph (Shimadzu Model GC-2014) with a Carboxen™-1010 PLOT Capillary column and carrier gas He; the column and TCD are kept at 180° C. and 230° C. respectively.

This apparatus can be used also to determine the diffusivities of $N_2$, $O_2$ and $CO_2$ as researchers have done for $CO_2$ and He. For pure $N_2$, the cell headspace pressure reduction with time can be measured (also for $O_2$). By assuming a deep liquid layer, one can use known equations to determine the $N_2$ diffusivity in the liquid knowing its solubility. One can next use the $N_2O$ analogy (the ratio of the solubilities of $CO_2$ and $N_2O$ remains constant for various solutions) and determine the solubility of $N_2O$ in the amine to be studied in the apparatus; literature values of the ratio of the solubilities of $CO_2$ and $N_2O$ is constant for various aqueous solutions of MEA. Such a ratio may be used to estimate Henry's law constant for $CO_2$ for the amines under consideration which by the method mentioned earlier will allow determination of $CO_2$ diffusivity.

System Performance Evaluation:

The system performance can be evaluated for a humidified feed flue gas pressure of around 1 bar (100 kPa) coming in at around 50° C. and a stripping temperature range of 80° C. to 95° C. for various amine absorbents. Feed flue gas composition will generally be 14% $CO_2$, 2% $O_2$ and balance $N_2$; a $CO_2$ concentration of as much as 17% could be tested. The concentration of $CO_2$ will be one of the most important metrics: for the stripped $CO_2$-rich stream the value should be 95%+. The second metric for evaluating the performance will be the % recovery of $CO_2$ in the stripped $CO_2$-rich stream from the feed flue gas input in any cycle (desired value 90%). A third metric would be reproducibility and repeatability of the results over consecutive runs. This can be determined by repeating runs for a given absorbent-membrane contactor system over 5 days. A fourth item would be the decrease if any in the total $CO_2$ absorption capability of the absorbent over a number of consecutive cycles especially when there is some $SO_2$ or $NO_2$ present in the feed flue gas.

Modeling the Performance of the TSMAB Device:

It is noted that one can model the following aspects: (1) Transient reactive $CO_2$ absorption from simulated wet flue gas flowing into and out of the device; (2) Thermal stripping of $CO_2$. The basic model for transient gas absorption from a gas stream flowing through the bore of the porous hollow fiber surrounded by an absorbent liquid has been developed and illustrated in Bhaumik et al. (Hollow Fiber Membrane-based Rapid Pressure Swing Absorption, AIChE J., 42(2), 409-421 (1996)) for both nonreactive and reactive absorption. One postulates based on the Happel's free surface model (Happel, 1959) that there is a thin layer of liquid around each porous hollow fiber of thickness $(r_e-r_o)$ where $r_o$ is the fiber O.D. and $r_e$ is the free surface radius such that transport in this thin liquid layer is influenced only by the fiber covered by this liquid layer. The equations for absorption in a nonreactive liquid for the gas phase concentration $C_{jg}$ as well as the liquid phase concentration $C_{jl}$ of any species j along with the initial and boundary conditions are reproduced below (r is the radial coordinate and z is the axial gas flow direction):

Gas Phase: 
$$\frac{\partial C_{jg}}{\partial t} = D_{jg}\frac{\partial^2 C_{jg}}{\partial z^2} - \frac{\partial}{\partial z}(v_g C_{jg}) - \frac{4K_{jg}d_o}{d_i^2}(C_{jg} - C_{jg}^i) \quad \text{(Eq. 6)}$$

where $$v_g = -\frac{RT d_i^2}{32\mu_g}\sum_{j=1}^{n}\frac{\partial C_{jg}}{\partial z}; \quad \text{(Eq. 7)}$$

$$C_{jg}^i = \frac{C_{jl}|_{r=r_o}}{H_j RT} \quad \text{(Eq. 8)}$$

Initial condition: at t=0, $C_{jg}$=0 (0≤z≤L) (Eq. 9); Boundary conditions:

$$v_g C_{jg}|_u = v_g C_{jg}\Big|_{z=0} - D_{jg}\frac{\partial C_{jg}}{\partial z}\Big|_{z=0}; \quad \text{(Eq. 10)}$$

$$D_{jg}\frac{\partial C_{jg}}{\partial z}\Big|_{z=L} = 0 \quad \text{(Eq. 11)}$$

Liquid Phase: 
$$\frac{\partial C_{jl}}{\partial t} = D_{jl}\left(\frac{\partial^2 C_{jl}}{\partial r^2} + \frac{1}{r}\frac{\partial C_{jl}}{\partial r}\right) - r_j \quad \text{(Eq. 12)}$$

Initial condition: at t=0, $C_{jl}$=0 (0≤z≤L and $r_o$<r<$r_e$) (Eq. 13); Boundary conditions:

$$-D_{jl}\frac{\partial C_{jl}}{\partial r}\Big|_{r=r_o} = K_{jg}\left(c_{jg} - \frac{C_{jl}|_{r=r_o}}{H_j RT}\right); \quad \text{(Eq. 14)}$$

$$\frac{\partial C_{jl}}{\partial r}\Big|_{r=r_e} = 0 \quad \text{(Eq. 15)}$$

One can numerically solve this time dependent problem and obtain the extent of gas absorption. This has been implemented by Chau et al. (Pressure Swing Membrane Absorption Process For Shifted Syngas Separation: Modeling vs. Experiments For Pure Ionic Liquid, J. Membrane Sci., 453, 61-70 (2014)) for $CO_2$ absorption as well as desorption in the PSMAB system with the pure ionic liquid [bmim][DCA]. For reactive systems, the liquid phase equation (12) has a reacton rate term $-r_j$ on the right hand side. Further since there are a number of species to deal with in the reactive system one needs additional equations for such species and simultaneously solve them; Bhaumik et al. (Hollow Fiber Membrane-based Rapid Pressure Swing Absorption, AIChE J., 42(2), 409-421 (1996)) provides guidance. The overall modeling can be carried out under isothermal conditions assuming that the heat transfer hollow fibers will take away the heat of absorption efficiently per FIG. 9A.

Problem (2) is essentially the absorption problem in reverse. However, thermal effects become important; the initial and boundary conditions are quite different. The endothermic heat of dissociation in the shell side liquid will be a thermal sink term with continuous heat supply from the heat transfer fibers via hot water in the fiber bore. There will also be evaporation of the small amount of water absorbed. The equation for the fluid temperature inside the heat transfer fibers is well known based on the Graetz problem; the boundary conditions are different from those used earlier for heat transfer fibers. Initially a simplified approach of constant solid hollow fiber wall temperature (high water flow rate) can be used to model thermal stripping. Both problems (1) and (2) are to be solved for different time periods depending on the absorption breakthrough time and the time needed for an effective desorption. The production rate depends on the cycle time which includes the sum of the two periods plus the cooling time (FIG. 9C) and the transients (in FIG. 9B). The relation between the optimum cycle time and the device dimensions is also useful. One can test the model results against experimental results for different scales of operation involving modules of differing dimensions and gas treatment capacity.

In an earlier study, the $CO_2$ desorption step was not modeled. In the latest modeling effort (Chau et al., 2014), desorption was studied under pressure reduction conditions. The proposed concept can require additional formulations vis-à-vis the rising temperature and the rapidly changing temperature profile during rapid heating for desorption in the TSMAB device. Calculation of the free surface radius $r_e$ requires further deliberations due to the second set of solid hollow fibers. The utility of $r_e$ can be verified by a 2-D analysis of $r_e$ via multiple possible configurations of two types of contiguous fibers.

In regards to the capability of the highly porous fluorosiloxane based plasma polymerized superhydrophobic coating on the outside diameter of porous hydrophobic polypropylene (PP) hollow fibers, it is noted that there can be a very limited possibility of the PP membrane pores getting wetted by the low molecular weight amine absorbents to be used. This is especially so since there is no flow related pressure drop in the liquid phase; the pressure difference between the gas phase and the liquid phase is very small. However there is a small possibility of some vapor from the amine absorbent getting adsorbed in the surface of the PP hollow fiber pore and making it somewhat more hydrophilic. By having a porous fluorosiloxane coating on the PP outside surface, one can eliminate direct contact of the PP surface with the amine absorbent. If one does observe some pore wetting, one may have to develop a somewhat less porous fluorosiloxane coating on the PP fiber OD. Under such a condition, whether the pore surface of a PP hollow fiber has any adsorption of MDEA or DEA or piperazine, it generally does not matter. The shell-side absorbent liquid does not touch the PP surface.

Another item is to design the membrane contactor modules such that the separation of the two sets of hollow fibers at both ends of the module takes place rapidly without creating too large a volume of liquid absorbent that cannot be exploited efficiently. To counteract such a feature one can make longer modules. This may lead to lower utilization of the inherent absorbent capacity since the gas flow rate per fiber may have to be reduced to make sure that flue gas pressure drop does not increase. This may mean that part of the length of the fibers would remain inactive since hollow fiber scrubbing is very efficient.

Another item is concerned with the duration of different parts of the cycle for a module as discussed above. In this technique conceptually four modules are needed, each module undergoing one particular step of a cycle. It may be necessary that the time taken in each step is reasonably close to one another; otherwise some of the modules will be in suspended animation resulting in loss of productive capacity since one particular step takes much longer. Therefore the designed operation should be such that each step takes a similar amount of time.

Although the systems/methods of the present disclosure have been described with reference to exemplary embodiments thereof, the present disclosure is not limited to such exemplary embodiments/implementations. Rather, the systems/methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure. Accordingly, it is appropriate that the appended claims be construed broadly and in a manner consistent with the scope of the disclosure.

What is claimed is:

1. A method to remove $CO_2$ from emissions comprising:
   providing a housing;
   disposing a first plurality and a second plurality of hollow fibers in the housing, the first plurality of hollow fibers including porous wall hydrophobic hollow fibers and the second plurality of hollow fibers including solid wall hollow fibers;
   disposing an absorbent in the housing between the first and second plurality of hollow fibers;
   flowing feed gas through the first plurality of hollow fibers, the first plurality of hollow fibers configured to allow $CO_2$ from the feed gas to diffuse to and be absorbed in the absorbent;
   shutting down the flow of feed gas;
   flowing hot water through the second plurality of hollow fibers to heat the absorbent and strip the absorbed $CO_2$ into the first plurality of hollow fibers; and
   withdrawing the stripped $CO_2$ from the housing through the first plurality of hollow fibers.

2. The method of claim 1, wherein the feed gas is flowed through the first plurality of hollow fibers at about 50° C.; and
   wherein the hot water is flowed through the second plurality of hollow fibers between about 85° C. and about 97° C.

3. The method of claim 1, wherein after the stripped $CO_2$ is withdrawn, the method further includes the step of flowing cold water through the second plurality of hollow fibers to cool the absorbent.

4. The method of claim 1, wherein the absorbent is a substantially pure low molecular weight amine absorbent.

5. The method of claim 1, wherein the absorbent is selected from the group consisting of methyldiethanolamine, diethanolamine, aMDEA, primary amines, secondary amines, tertiary amines, hindered amines, oligomeric non-volatile amines, polyamidoamine dendrimer generation 0, and mixtures thereof.

6. The method of claim 1, wherein the first and second plurality of hollow fibers include polymeric hollow fibers that are commingled with one another within the housing.

7. The method of claim 1, wherein the second plurality of hollow fibers are substantially impermeable to moisture, $CO_2$, $N_2$ and $O_2$.

8. The method of claim 1, wherein the absorbent includes from about 5% to about 50% water; and
   wherein the housing is connected to a reservoir containing additional absorbent.

9. The method of claim 1, wherein the first plurality of hollow fibers includes hollow fibers having an outer diameter of about 290 μm and an inner diameter of about 240 μm, and having a wall porosity of from about 0.20 to about 0.80; and
   wherein the second plurality of hollow fibers includes hollow fibers having an inner diameter between about 250 μm and about 300 gm, and having a solid wall thickness between about 50 μm to about 75 μm.

10. The method of claim 1, wherein the first plurality of hollow fibers includes hollow fibers having a highly porous superhydrophobic fluorosiloxane coating on the outer diameter of the fibers.

11. A method to remove $CO_2$ from emissions comprising:
    providing a cylindrical housing;
    disposing a first plurality and a second plurality of polymeric hollow fibers in the cylindrical housing, the first plurality of polymeric hollow fibers including porous wall hydrophobic hollow fibers and the second plurality of polymeric hollow fibers including solid wall hollow fibers, the first and second plurality of polymeric hollow fibers commingled with one another within the cylindrical housing;
    disposing an amine absorbent in the cylindrical housing between the first and second plurality of polymeric hollow fibers;
    flowing flue gas through the first plurality of polymeric hollow fibers, the first plurality of polymeric hollow fibers configured to allow $CO_2$ from the flue gas to diffuse to and be absorbed in the amine absorbent;
    shutting down the flow of flue gas;

flowing hot water through the second plurality of polymeric hollow fibers to heat the amine absorbent and strip the absorbed $CO_2$ into the first plurality of polymeric hollow fibers;

withdrawing the stripped $CO_2$ from the cylindrical housing through the first plurality of polymeric hollow fibers; and flowing cold water, after the stripped $CO_2$ is withdrawn, through the second plurality of polymeric hollow fibers to cool the amine absorbent.

* * * * *